(12) United States Patent
Abotabl et al.

(10) Patent No.: US 11,968,153 B2
(45) Date of Patent: Apr. 23, 2024

(54) TIMING CONSIDERATIONS AND SWITCHING BETWEEN TIME DIVISION DUPLEXING PATTERNS IN FLEXIBLE BANDWIDTH PARTS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 17/454,682

(22) Filed: Nov. 12, 2021

(65) Prior Publication Data
US 2023/0155798 A1 May 18, 2023

(51) Int. Cl.
*H04L 5/00* (2006.01)
*H04L 5/14* (2006.01)

(52) U.S. Cl.
CPC .......... *H04L 5/0092* (2013.01); *H04L 5/1469* (2013.01)

(58) Field of Classification Search
CPC .... H04L 5/0051; H04B 7/0626; H04W 28/20; H04W 72/23
See application file for complete search history.

(56) References Cited

U.S. PATENT DOCUMENTS

| | | | | |
|---|---|---|---|---|
| 11,528,741 B2* | 12/2022 | Yeo | ......................... | H04W 72/23 |
| 11,558,169 B2* | 1/2023 | Jiang | ...................... | H04L 5/0091 |
| 11,589,266 B2* | 2/2023 | Shen | ...................... | H04L 5/0098 |
| 2019/0141742 A1* | 5/2019 | Zhou | ...................... | H04L 5/0064 |
| 2020/0280474 A1* | 9/2020 | Babaei | .............. | H04L 27/26025 |
| 2021/0084650 A1* | 3/2021 | Fan | ......................... | H04L 5/0098 |
| 2021/0176626 A1 | 6/2021 | Abdelghaffar et al. | | |

(Continued)

OTHER PUBLICATIONS

International Search Report and Written Opinion—PCT/US2022/078976—ISA/EPO—dated Feb. 16, 2023.

(Continued)

*Primary Examiner* — Shukri Taha
(74) *Attorney, Agent, or Firm* — Harrity & Harrity, LLP

(57) ABSTRACT

To enable full-duplex communication in a time division duplexing (TDD) band, a network node (e.g., a user equipment (UE)) may be configured to communicate in one or more flexible bandwidth parts (BWPs) using BWP-specific TDD patterns regardless of a TDD pattern configured for the underlying band. However, in some cases, half-duplex communication may offer better performance than full-duplex communication (e.g., when full-duplex communication may cause self-interference or there is a need for high throughput half-duplex communication). Accordingly, some aspects described herein relate to timing considerations and switching indications for indicating an interval in which the network node is to operate in the flexible BWP using the BWP-specific TDD pattern and switching between the BWP-specific TDD pattern and the TDD pattern of the underlying band (e.g., using switching indications based on a number or quantity of transmission time intervals and/or a timer, among other examples).

32 Claims, 13 Drawing Sheets

(56) References Cited

U.S. PATENT DOCUMENTS

| | | | |
|---|---|---|---|
| 2021/0297226 A1 | 9/2021 | Abotabl et al. | |
| 2021/0314953 A1* | 10/2021 | Park | H04W 76/11 |
| 2021/0321409 A1* | 10/2021 | Fakoorian | H04L 5/14 |
| 2022/0201767 A1* | 6/2022 | Wei | H04W 16/10 |
| 2023/0101801 A1* | 3/2023 | Cozzo | H04L 5/14 |
| | | | 370/277 |

OTHER PUBLICATIONS

Spreadtrum Communications: "R18 Flexible/Full Duplex Considerations", 3GPP TSG RAN Rel-18 Workshop, RWS-210054, 3rd Generation Partnership Project (3GPP), Mobile Competence Centre, 650, Route Des Lucioles, F-06921, Sophia-Antipolis Cedex, France, vol. TSG RAN, No. Electronic Meeting, Jun. 28, 2021-Jul. 2, 2021, Jun. 7, 2021, 6 Pages, XP052025617, p. 4.

* cited by examiner

TIMING CONSIDERATIONS AND SWITCHING BETWEEN TIME DIVISION DUPLEXING PATTERNS IN FLEXIBLE BANDWIDTH PARTS

FIELD OF THE DISCLOSURE

Aspects of the present disclosure generally relate to wireless communication and to techniques and apparatuses associated with timing considerations and switching between time division duplexing (TDD) patterns in a flexible bandwidth part (BWP).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

The present disclosure generally relates to improving the manner in which flexible time-division duplexing (TDD) operates to support full-duplex communication, which generally refers to concurrent downlink and uplink transmissions in unpaired spectrum. Full-duplex communication may provide a reduction in latency, enhanced spectral efficiency, and/or a high data rate. For example, full-duplex communication may reduce latency for a user equipment (UE) having full-duplex capabilities by enabling the UE to receive a downlink signal in an uplink-only transmission time interval, or to transmit an uplink signal in a downlink-only transmission time interval. In addition, full-duplex communication may enhance spectral efficiency or increase a downlink and/or uplink data rate by concurrently utilizing time and frequency resources for downlink communication and uplink communication.

In some cases, full-duplex communication may be enabled in a TDD band by configuring one or more flexible bandwidth parts (BWPs) with BWP-specific TDD patterns that may be used regardless of a TDD pattern configured for an underlying band. For example, a first flexible BWP may be configured with a first BWP-specific TDD pattern in which transmission time intervals are allocated to the downlink or the uplink and a second flexible BWP may be configured with a second BWP-specific TDD pattern in which transmission time intervals are allocated to the downlink or the uplink. Accordingly, one or more transmission time intervals may support full-duplex communication when a downlink transmission time interval in the first flexible BWP overlaps with an uplink transmission time interval in the second flexible BWP (or vice versa). However, in some cases, half-duplex communication may offer better performance than full-duplex communication (e.g., when full-duplex communication may cause self-interference or a UE needs high throughput half-duplex communication).

Accordingly, some aspects described herein relate to timing considerations for indicating an interval in which a UE is to operate in a flexible BWP using a BWP-specific TDD pattern and switching between the BWP-specific TDD pattern and a TDD pattern of an underlying frequency band that includes the flexible BWP. For example, in some aspects, a base station may configure the UE to operate with the BWP-specific TDD pattern for an interval, which may be indicated as a duration of time, a number (e.g., a quantity) of transmission time intervals, a number (e.g., a quantity) of repetitions of the TDD pattern, and/or a timer that the UE starts when the flexible BWP is activated or communication using the BWP-specific TDD pattern is otherwise enabled. In some aspects, after the interval has ended, the UE may switch from the BWP-specific TDD pattern to the TDD pattern of the underlying frequency band. Additionally, or alternatively, the UE may switch from the flexible BWP to one or more BWPs other than the flexible BWP after the interval has ended. In this way, the UE may be configured to switch between the BWP-specific TDD and the TDD pattern of the underlying frequency band and/or between the flexible BWP and one or more other BWPs (e.g., depending on whether full-duplex or half-duplex operation is desired).

Some aspects described herein relate to a first network node for wireless communication. The first network node may include a memory and one or more processors coupled to the memory. The one or more processors may be configured to receive a BWP configuration from a second network node, wherein the BWP configuration indicates a TDD pattern specific to a flexible BWP and an interval in which to operate in the flexible BWP using the TDD pattern specific to the flexible BWP. The one or more processors may be configured to communicate in the flexible BWP using the TDD pattern specific to the flexible BWP during the interval.

Some aspects described herein relate to a first network node for wireless communication. The first network node may include a memory and one or more processors coupled to the memory. The one or more processors may be configured to transmit a BWP configuration to a second network node, wherein the BWP configuration indicates a TDD pattern specific to a flexible BWP and an interval in which to operate in the flexible BWP using the TDD pattern specific to the flexible BWP. The one or more processors may be configured to communicate with the second network node in the flexible BWP using the TDD pattern specific to the flexible BWP during the interval.

Some aspects described herein relate to a method of wireless communication performed by a first network node. The method may include receiving a BWP configuration from a second network node, wherein the BWP configuration indicates a TDD pattern specific to a flexible BWP and an interval in which to operate in the flexible BWP using the TDD pattern specific to the flexible BWP. The method may include communicating in the flexible BWP using the TDD pattern specific to the flexible BWP during the interval.

Some aspects described herein relate to a method of wireless communication performed by a first network node. The method may include transmitting a BWP configuration to a second network node, wherein the BWP configuration indicates a TDD pattern specific to a flexible BWP and an interval in which to operate in the flexible BWP using the TDD pattern specific to the flexible BWP. The method may include communicating with the second network node in the flexible BWP using the TDD pattern specific to the flexible BWP during the interval.

Some aspects described herein relate to a non-transitory computer-readable medium that stores a set of instructions for wireless communication by a first network node. The set of instructions, when executed by one or more processors of the first network node, may cause the first network node to receive a BWP configuration from a second network node, wherein the BWP configuration indicates a TDD pattern specific to a flexible BWP and an interval in which to operate in the flexible BWP using the TDD pattern specific to the flexible BWP. The set of instructions, when executed by one or more processors of the first network node, may cause the first network node to communicate in the flexible BWP using the TDD pattern specific to the flexible BWP during the interval.

Some aspects described herein relate to a non-transitory computer-readable medium that stores a set of instructions for wireless communication by a first network node. The set of instructions, when executed by one or more processors of the first network node, may cause the first network node to transmit a BWP configuration to a second network node, wherein the BWP configuration indicates a TDD pattern specific to a flexible BWP and an interval in which to operate in the flexible BWP using the TDD pattern specific to the flexible BWP. The set of instructions, when executed by one or more processors of the first network node, may cause the first network node to communicate with the second network node in the flexible BWP using the TDD pattern specific to the flexible BWP during the interval.

Some aspects described herein relate to an apparatus for wireless communication. The apparatus may include means for receiving a BWP configuration from a network node, wherein the BWP configuration indicates a TDD pattern specific to a flexible BWP and an interval in which to operate in the flexible BWP using the TDD pattern specific to the flexible BWP. The apparatus may include means for communicating in the flexible BWP using the TDD pattern specific to the flexible BWP during the interval.

Some aspects described herein relate to an apparatus for wireless communication. The apparatus may include means for transmitting a BWP configuration to a network node, wherein the BWP configuration indicates a TDD pattern specific to a flexible BWP and an interval in which to operate in the flexible BWP using the TDD pattern specific to the flexible BWP. The apparatus may include means for communicating with the network node in the flexible BWP using the TDD pattern specific to the flexible BWP during the interval.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages are described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
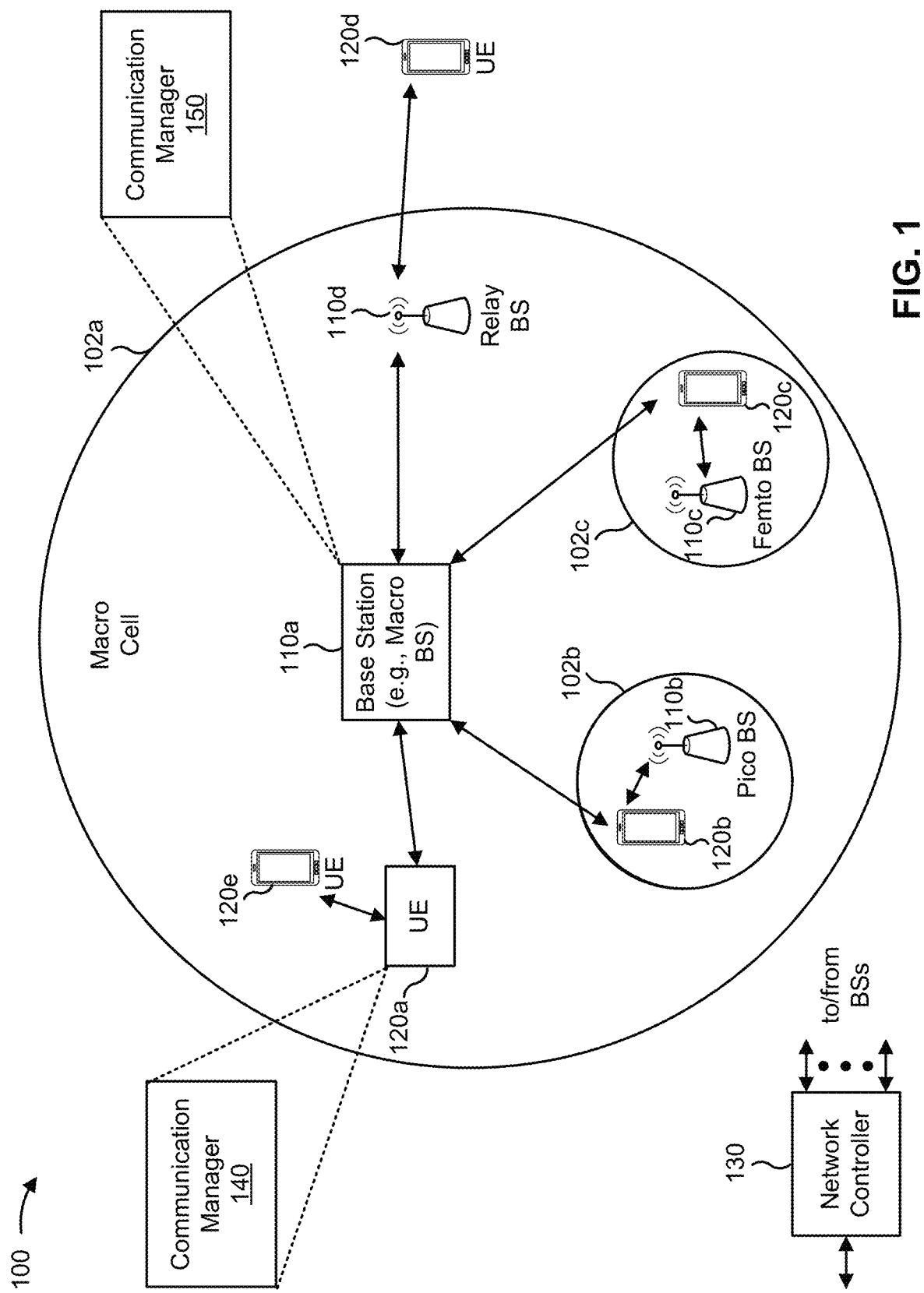
FIG. 1 is diagram illustrating an example of a wireless network.

The detailed description set forth below in connection with the drawings is a description of various configurations and does not represent the only configurations in which the concepts described herein may be practiced. The detailed description includes specific details that thoroughly describe various concepts. However, these concepts may be practiced without these specific details. In some instances, well-known structures and components are shown in block diagram form to avoid obscuring such concepts.

Several aspects of telecommunication systems are presented with reference to various apparatus and methods. These apparatus and methods are described herein and illustrated in the drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, any combination thereof, or otherwise.

Accordingly, the functions described herein may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a bandwidth part (BWP) configuration from a network node (e.g., a base station), wherein the BWP configuration indicates a time division duplexing (TDD) pattern specific to a flexible BWP and an interval in which to operate in the flexible BWP using the TDD pattern specific to the flexible BWP; and communicate in the flexible BWP using the TDD pattern specific to the flexible BWP during the interval. Additionally, or alternatively, the communication manager 140 may perform one or more other operations described herein.

In some aspects, the base station 110 may include a communication manager 150. As described in more detail elsewhere herein, the communication manager 150 may transmit a BWP configuration to a network node (e.g., a UE), wherein the BWP configuration indicates a TDD pattern specific to a flexible BWP and an interval in which to operate in the flexible BWP using the TDD pattern specific to the flexible BWP; and communicate with the second network node in the flexible BWP using the TDD pattern specific to the flexible BWP during the interval. Additionally, or alternatively, the communication manager 150 may perform one or more other operations described herein.

As indicated above, FIG. 1 is provided as an example. Other examples may differ from what is described with regard to FIG. 1.

Figure 2:
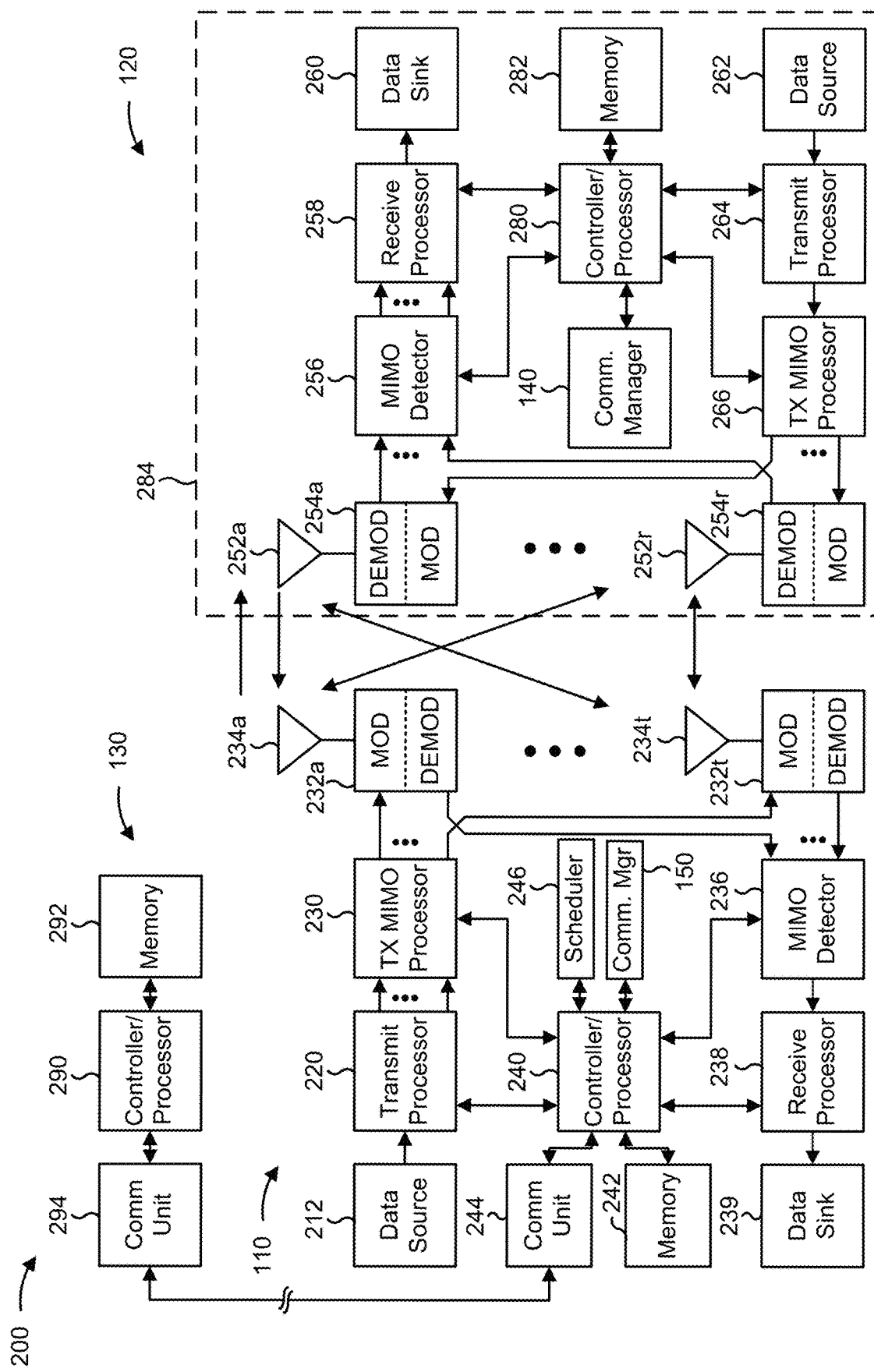
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with timing considerations and switching between TDD patterns in a flexible BWP, as described in more detail elsewhere herein. As described herein, a node, which may be referred to as a node, a network node, or a wireless node, may be a base station 110, a UE 120, a network controller 130, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. In this example, consistent with this disclosure, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like configured to transmit the information.

Figure 6:
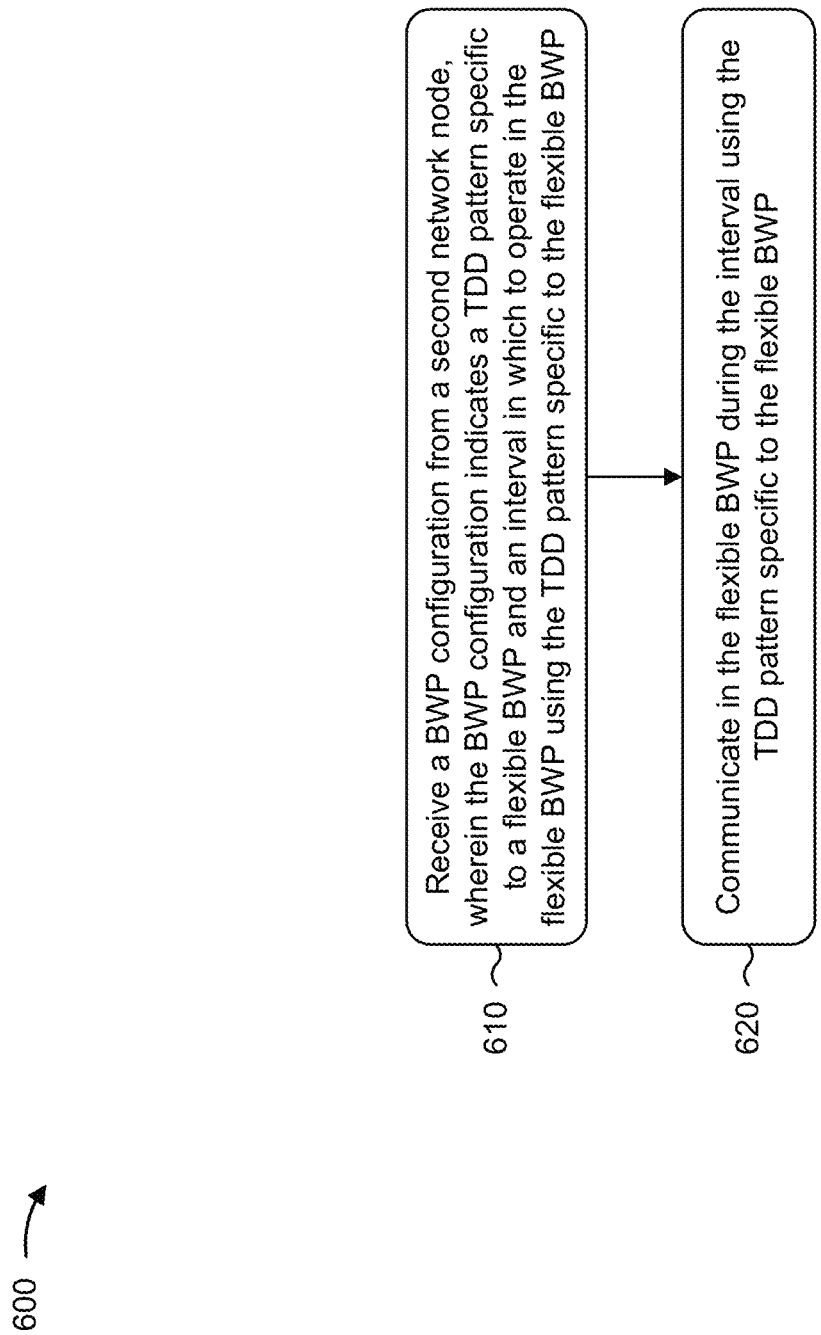
FIGS. 6-7 are flowcharts of example methods of wireless communication.
Figure 7:
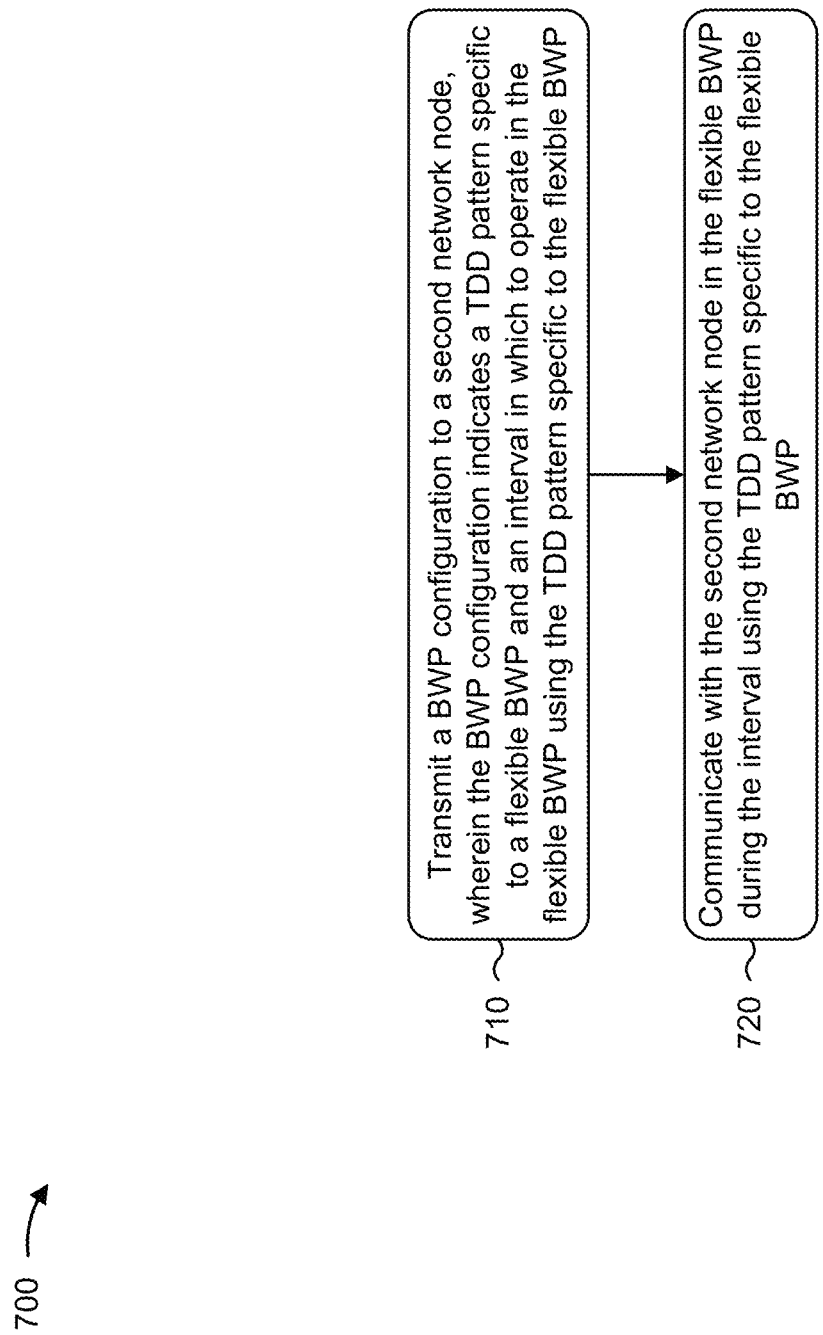

For example, the controller/processor 240 of the base station 110, the controller/processor 280 of the UE 120, and/or any other component(s) of FIG. 2 may perform or direct operations of, for example, method 600 of FIG. 6, method 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 600 of FIG. 6, method 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving a BWP configuration from the base station 110, wherein the BWP configuration indicates a TDD pattern specific to a flexible BWP and an interval in which to operate in the flexible BWP using the TDD pattern specific to the flexible BWP; and/or means for communicating in the flexible BWP using the TDD pattern specific to the flexible BWP during the interval. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting a BWP configuration to the UE 120, wherein the BWP configuration indicates a TDD pattern specific to a flexible BWP and an interval in which to operate in the flexible BWP using the TDD pattern specific to the flexible BWP; and/or means for communicating with the UE 120 in the flexible BWP using the TDD pattern specific to the flexible BWP during the interval. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
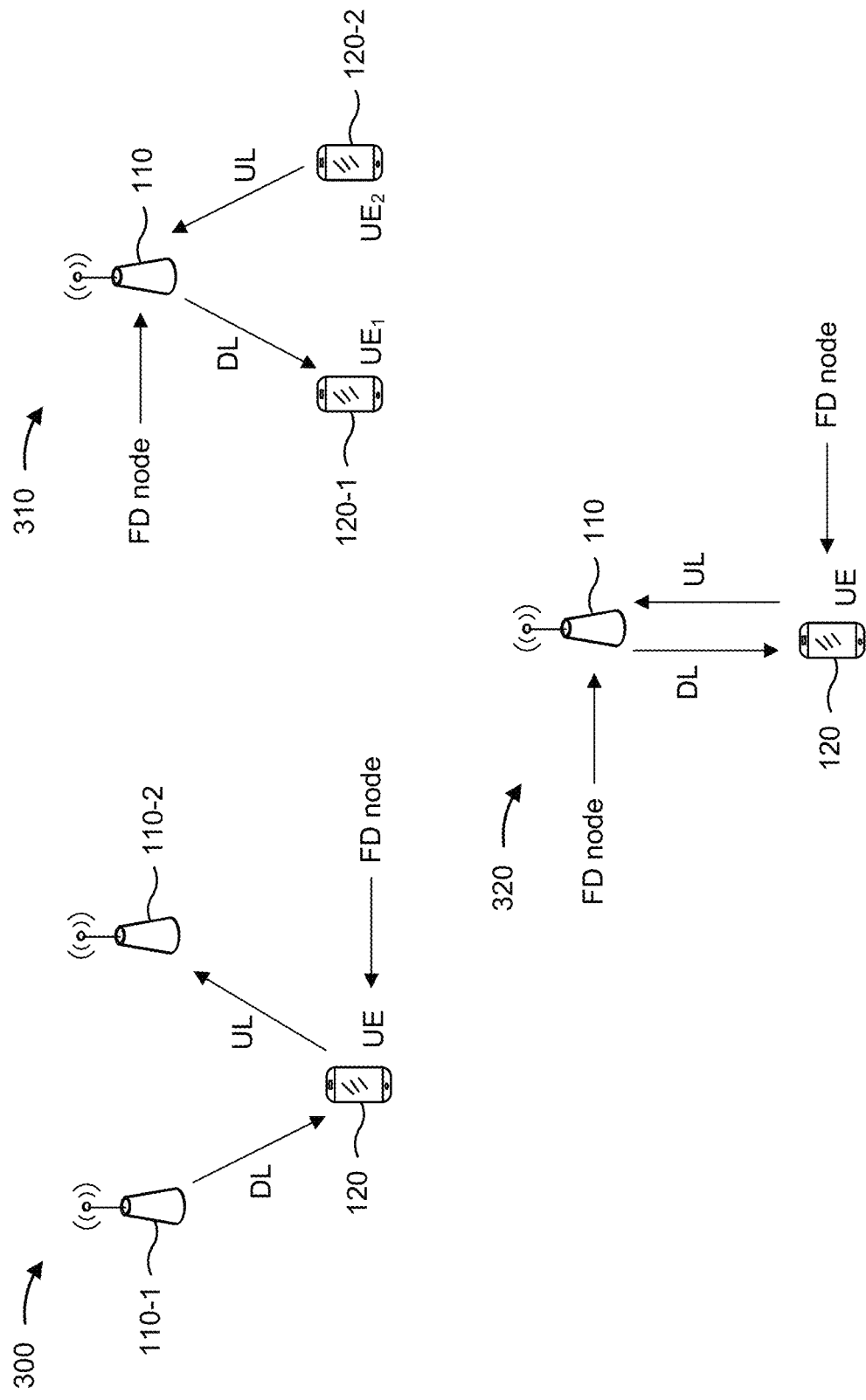
FIG. 3 is a diagram illustrating examples of full-duplex communication.

FIG. 3 is a diagram illustrating examples 300, 310, 320 of full-duplex communication. As shown in FIG. 3, examples 300, 310, 320 include one or more UEs 120 in communication with one or more base stations 110 and/or TRPs 110 in a wireless network that supports full-duplex communication. However, it will be appreciated that the devices shown in FIG. 3 are exemplary only, and that the wireless network may support full-duplex communication between other devices (e.g., between a UE 120 and a base station 110 or a TRP 110, between a mobile termination node and a control node, between an integrated access and backhaul (IAB) child node and an IAB parent node, and/or between a scheduled node and a scheduling node).

As shown in FIG. 3, example 300 includes a UE 120 in communication with two base stations (e.g., TRPs) 110-1, 110-2. As shown in FIG. 3, the UE 120 may transmit one or more uplink transmissions to base station 110-1 and may concurrently receive one or more downlink transmission from base station 110-2. Accordingly, in example 300, full-duplex communication is enabled for the UE 120, which may be operating as a full-duplex node, but not for the base stations 110-1, 110-2, which may be operating as half-duplex nodes. Additionally, or alternatively, example 310 includes a first UE 120-1 and a second UE 120-2, in communication with a base station 110. In this case, the base station 110 may transmit one or more downlink transmissions to the first UE 120-1 and may concurrently receive one or more uplink transmissions from the second UE 120-2. Accordingly, in example 310, full-duplex communication is enabled for the base station 110, which may be operating as a full-duplex node, but not for the first UE 120-1 and the second UE 120-2, which are operating as half-duplex nodes. Additionally, or alternatively, example 320 includes a UE 120 in communication with a base station 110. In this case, the base station 110 may transmit, and the UE 120 may receive, one or more downlink transmissions concurrently with the UE 120 transmitting, and the base station 110 receiving, one or more uplink transmissions. Accordingly, in the example 320, full-duplex communication is enabled for both the UE 120 and the base station 110, each of which is operating as a full-duplex node.

The present disclosure generally relates to improving the manner in which flexible TDD operates to support full-duplex communication, which generally refers to simultaneous downlink and uplink transmissions in unpaired spectrum. Flexible TDD capabilities that support full-duplex communication may be present at a scheduling node (e.g., a base station, a TRP, a control node, and/or a parent node), a scheduled node (e.g., a UE, a mobile termination (MT) node, and/or a child node), or both. For example, at a UE, uplink transmission may be from one antenna panel and downlink reception may be in another antenna panel. In general, full-duplex communication may be conditional on beam separation between an uplink beam and a downlink beam at the respective antenna panels in order to minimize self-interference that may occur when a transmitted signal leaks into a receive port and/or when an object in a surrounding environment reflects a transmitted signal back to a receive port (e.g., causing a clutter echo effect). Accordingly, improving the manner in which transmission parameters are determined or otherwise configured for the uplink and the downlink to enable full-duplex communication is desirable. Utilizing full-duplex communication may provide reduced latency by allowing a UE to receive a downlink signal in an uplink-only slot, or to transmit an uplink signal in a downlink-only slot. In addition, full-duplex communication may enhance spectral efficiency or throughput per cell or per UE and/or enable more efficient resource utilization by simultaneously utilizing time and frequency resources for downlink communication and uplink communication.

As indicated above, FIG. 3 is provided as one or more examples. Other examples may differ from what is described with regard to FIG. 3.

Figure 4A:
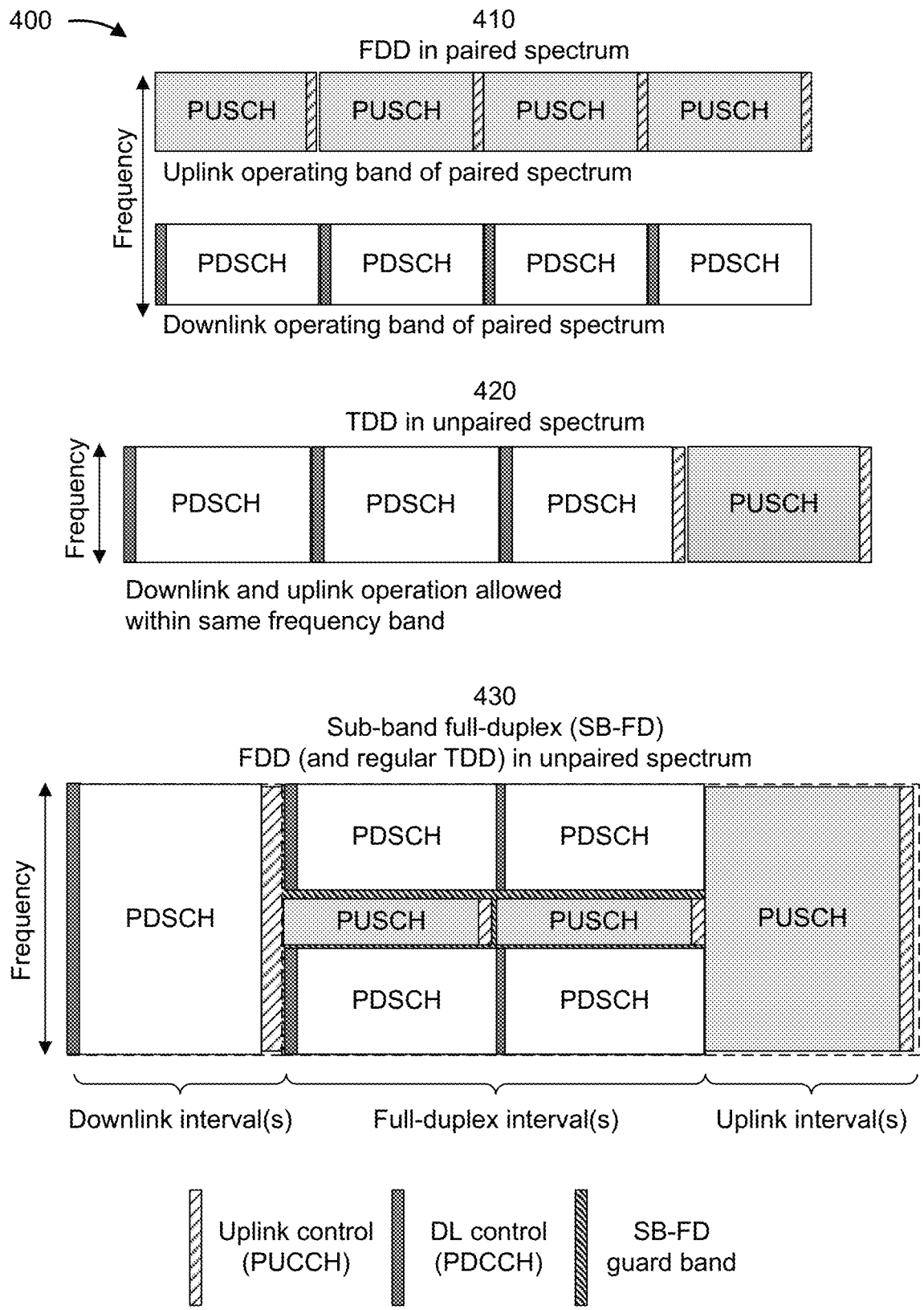
FIG. 4A is a diagram illustrating examples of different duplexing modes.
Figure 4B:
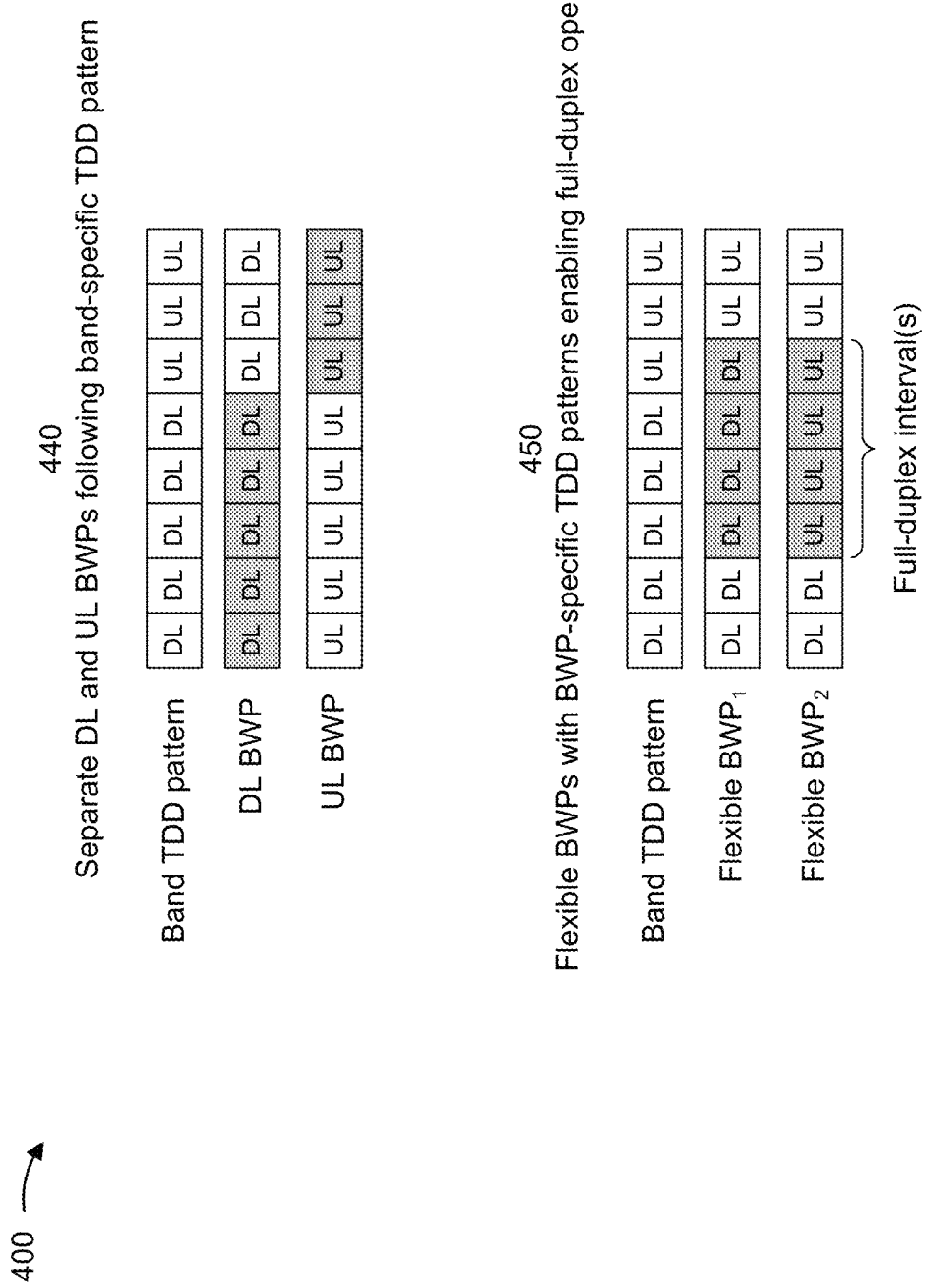
FIG. 4B is a diagram illustrating examples of a band-specific time division duplexing (TDD) pattern and a bandwidth part (BWP)-specific TDD pattern.

FIGS. 4A-4B are diagrams illustrating examples of different duplexing modes. For example, as described in further detail herein, FIG. 4A is a diagram illustrating an example 410 of frequency division duplexing (FDD) mode in paired spectrum, an example 420 of TDD mode in unpaired spectrum, and an example 430 of sub-band full-duplexing (SBFD) in unpaired spectrum, and FIG. 4B is a diagram illustrating an example 440 of a band-specific TDD pattern that may be applied in one or more downlink-only and/or uplink-only BWPs and an example 450 of a BWP-specific TDD pattern that may be applied in one or more flexible BWPs (e.g., to enable full-duplexing in an unpaired TDD band).

In some aspects, a wireless communication standard and/or governing body may generally specify one or more duplexing modes in which a wireless spectrum is to be used. For example, 3GPP may specify how wireless spectrum is to be used for the 5G/NR radio access technology and interface. As an example, a specification may indicate whether a band is to be used as paired spectrum in an FDD mode or as unpaired spectrum in a TDD mode.

For example, as shown by example 410, paired spectrum in FDD mode may use a first frequency region (or channel) for uplink communication and a second frequency region (or channel) for downlink communication. In such cases, the frequency regions or channels used for uplink communication and downlink communication do not overlap, have different center frequencies, and have sufficient separation to prevent interference between the downlink communication and the uplink communication. For example, paired spectrum in FDD mode may include an uplink operating band and a downlink operating band that are configured to use non-overlapped frequency regions separated by a guard band. Accordingly, when operating in FDD mode in paired spectrum, a UE with full-duplex capabilities may perform concurrent transmit and receive operations using the separate operating bands allocated to downlink and uplink communication. For example, paired bands in NR include NR operating bands n1, n2, n3, n5, n7, n8, n12, n20, n25, and n28, as specified by 3GPP Technical Specification (TS) 38.101-1.

Alternatively, as shown by example 420, unpaired spectrum in TDD mode may allow downlink and uplink operation within a single frequency region (e.g., a single operating band). For example, when operating in TDD mode in unpaired spectrum, downlink communication and uplink communication may occur in the same frequency range. Some deployments may use TDD in the unpaired band, whereby some transmission time intervals (e.g., frames, slots, and/or symbols) are used for downlink communication only and other transmission time intervals are used for uplink communication only. In this case, substantially the entire bandwidth of a component carrier may be used for downlink communication or uplink communication, depending on whether the communication is performed in a downlink interval, an uplink interval, or a special interval (in which either downlink or uplink communication can be scheduled). Examples of unpaired bands include NR operating bands n40, n41, and n50, as specified by 3GPP TS 38.101-1. In some cases, however, using TDD in unpaired spectrum may be inefficient. For example, uplink transmit power may be limited, meaning that UEs may be incapable of transmitting with enough power to efficiently utilize the full bandwidth of an uplink slot. This may be particularly problematic in large cells at the cell edge. Furthermore, using TDD may introduce latency relative to a full-duplex scheme in which uplink communications and downlink communications can be performed in the same time interval, since TDD restricts usage of a given transmission time interval to uplink or downlink communication only. Furthermore, using TDD may reduce spectral efficiency and/or reduce throughput by restricting usage of a given transmission time interval to uplink or downlink communication only.

Accordingly, as shown by example 430, an unpaired band may be configured in a sub-band full-duplex (SB-FD) mode in order to enable TDD operation and/or FDD operation in unpaired spectrum. For example, as shown in FIG. 4A, an unpaired band configured in the SB-FD mode may associate one or more transmission time intervals with downlink communication only, one or more transmission time intervals for uplink communication only, and one or more transmission time intervals for both downlink communication and uplink communication. Each transmission time interval may be associated with a control region, illustrated as a portion of a time interval with a diagonal fill for uplink control (e.g., a physical uplink control channel (PUCCH)) or a darker-shaded fill for downlink control (e.g., a physical downlink control channel (PDCCH)). Additionally, or alternatively, each time interval may be associated with a data region, which is shown as a physical downlink shared channel (PDSCH) for downlink frequency regions or a physical uplink shared channel (PUSCH) for uplink frequency regions.

In some aspects, an unpaired band configured in the SB-FD mode may include one or more full-duplex time intervals (e.g., frames, subframes, slots, and/or symbols, among other examples) that are associated with an FDD configuration. For example, as shown in FIG. 4A, the FDD configuration associated with a full-duplex time interval may indicate one or more downlink frequency regions (or sub-bands) and one or more uplink frequency regions (or sub-bands) that are separated by a guard band. Accordingly, an FDD configuration may divide an unpaired frequency band (e.g., one or more component carriers of an unpaired band) into uplink frequency regions, downlink frequency regions, and/or other regions (e.g., guard bands and/or the like), which may enable a UE with full-duplex capabilities to perform simultaneous transmit and receive operations during one or more time intervals that are divided into downlink and uplink sub-bands with a guard band separation to prevent the uplink transmission from causing self-interference with respect to downlink reception. In some aspects, the FDD configuration may identify BWP configurations corresponding to the uplink frequency regions and the downlink frequency regions. For example, a respective BWP may be configured for each uplink frequency region and each downlink frequency region.

For example, full-duplexing capabilities may be enabled in unpaired spectrum in the SB-FD mode by configuring one or more flexible BWPs, which may be overlapping in a frequency domain or non-overlapping in the frequency domain (e.g., separated by guard band). As described herein, the term "flexible BWP" may generally refer to a BWP configured with a BWP-specific TDD pattern that can be used regardless of a communication direction indicated in a TDD pattern associated with an unpaired frequency band that includes the flexible BWP. For example, referring to FIG. 4B, example 440 illustrates a typical BWP configuration, where an unpaired frequency band includes a downlink BWP and an uplink BWP, each of which includes a contiguous set of physical resource blocks (PRBs) on a given component carrier. Furthermore, as shown, a band-specific TDD pattern may be defined for the underlying frequency band that includes the downlink BWP and the uplink BWP, where the band-specific TDD pattern includes a TDD sequence in which transmission time intervals are allocated to either downlink communication or uplink communication. For example, as described in further detail below with reference to FIG. 5A, the band-specific TDD pattern or TDD sequence may be defined using a common TDD pattern, a dedicated TDD pattern, and/or a slot format indicator (SFI). Accordingly, as shown by the shaded regions in example 440, a UE may operate in the downlink BWP during transmission time intervals that are allocated to downlink communication in the band-specific TDD pattern, and the UE may operate in the uplink BWP during transmission time intervals that are allocated to uplink communication in the band-specific TDD pattern.

Alternatively, as shown by example 450, full-duplex operation may be enabled in the unpaired frequency band by configuring one or more flexible BWPs that are associated with respective BWP-specific TDD patterns that may be used regardless of a direction indicated in the common TDD pattern, the dedicated TDD pattern, and/or the SFI that defines the TDD sequence for the underlying frequency band. For example, as shown in FIG. 4B, a first flexible BWP (shown as flexible BWP$_1$) is configured with a first BWP-specific TDD pattern that includes six downlink transmission time intervals followed by two uplink transmission time intervals and a second flexible BWP (shown as flexible BWP$_2$) is configured with a second BWP-specific TDD pattern that includes two downlink transmission time intervals followed by six uplink transmission time intervals. Accordingly, as shown, the BWP-specific TDD patterns may differ from the TDD pattern of the underlying frequency band, which may allow full-duplex operation in one or more transmission time intervals (shown by the shaded regions in example 450). For example, a UE may perform uplink transmission in the third, fourth, and fifth transmission time intervals even though such transmission time intervals are allocated to downlink communication in the TDD pattern of the underlying frequency band. Similarly, the UE may perform downlink reception in the sixth transmission time interval even though such transmission time interval is allocated to uplink communication in the TDD pattern of the underlying frequency band. In this way, by configuring one or more flexible BWPs with BWP-specific TDD patterns that may be applied regardless of the communication direction indicated in the common TDD pattern, the dedicated TDD pattern, and/or the SFI that defines the TDD sequence for the underlying frequency band, configuring one or more flexible BWPs may enable full-duplex operation in unpaired spectrum.

Accordingly, as described herein, enabling full-duplex operation in unpaired spectrum may increase spectral efficiency, enable high data rates, and/or reduce latency (e.g., to support ultra-reliable low latency communication (URLLC) control channels). For example, configuring flexible BWPs to enable full-duplex operation in unpaired spectrum may reduce latency by providing more uplink transmission opportunities (e.g., in example 450, a UE may transmit as early as the third transmission time interval rather than having to wait until the sixth transmission time interval if the band-specific TDD pattern were in effect). Furthermore, configuring flexible BWPs to enable full-duplex operation may enhance spectral efficiency or throughput and/or enable more efficient resource utilization by simultaneously utilizing time resources for downlink and uplink communication. However, scheduling simultaneous downlink and uplink transmissions in unpaired spectrum is associated with various challenges. For example, in some cases, half-duplex operation (e.g., downlink-only or uplink-only) may offer better performance than full-duplex operation (e.g., when full-duplex communication may cause self-interference or cross-link interference and/or or a UE needs to perform a half-duplex operation with a high data rate). In other words, operating in a flexible BWP using the BWP-specific TDD pattern may not be advantageous in certain scenarios, whereby allowing the flexible BWP configuration to switch between the BWP-specific TDD pattern and the band-specific TDD pattern of the underlying frequency band may be desired to cover half-duplex operation and full-duplex operation.

Accordingly, some aspects described herein relate to timing considerations for indicating an interval in which a UE is to operate in a flexible BWP using a BWP-specific TDD pattern and switching between the BWP-specific TDD pattern and a TDD pattern of an underlying frequency band that includes the flexible BWP. For example, in some aspects, a base station may configure the UE to operate with the BWP-specific TDD pattern for an interval, which may be indicated as a duration of time, a number of transmission time intervals (e.g., a quantity of transmission time intervals), a number of repetitions of the TDD pattern (e.g., a quantity of repetitions of the TDD pattern), and/or a timer that the UE starts when the flexible BWP is activated or communication using the BWP-specific TDD pattern is otherwise enabled. In some aspects, after the interval has ended, the UE may switch from the BWP-specific TDD pattern to the TDD pattern of the underlying frequency band. Additionally, or alternatively, the UE may switch from the flexible BWP to one or more BWPs (other than the flexible BWP) after the interval has ended. In this way, the UE may be configured to switch between the BWP-specific TDD and the TDD pattern of the underlying frequency band and/or between the flexible BWP and one or more other BWPs (e.g., depending on whether full-duplex or half-duplex operation is desired).

As indicated above, FIGS. 4A-4B are provided as one or more examples. Other examples may differ from what is described with regard to FIGS. 4A-4B.

Figure 5A:
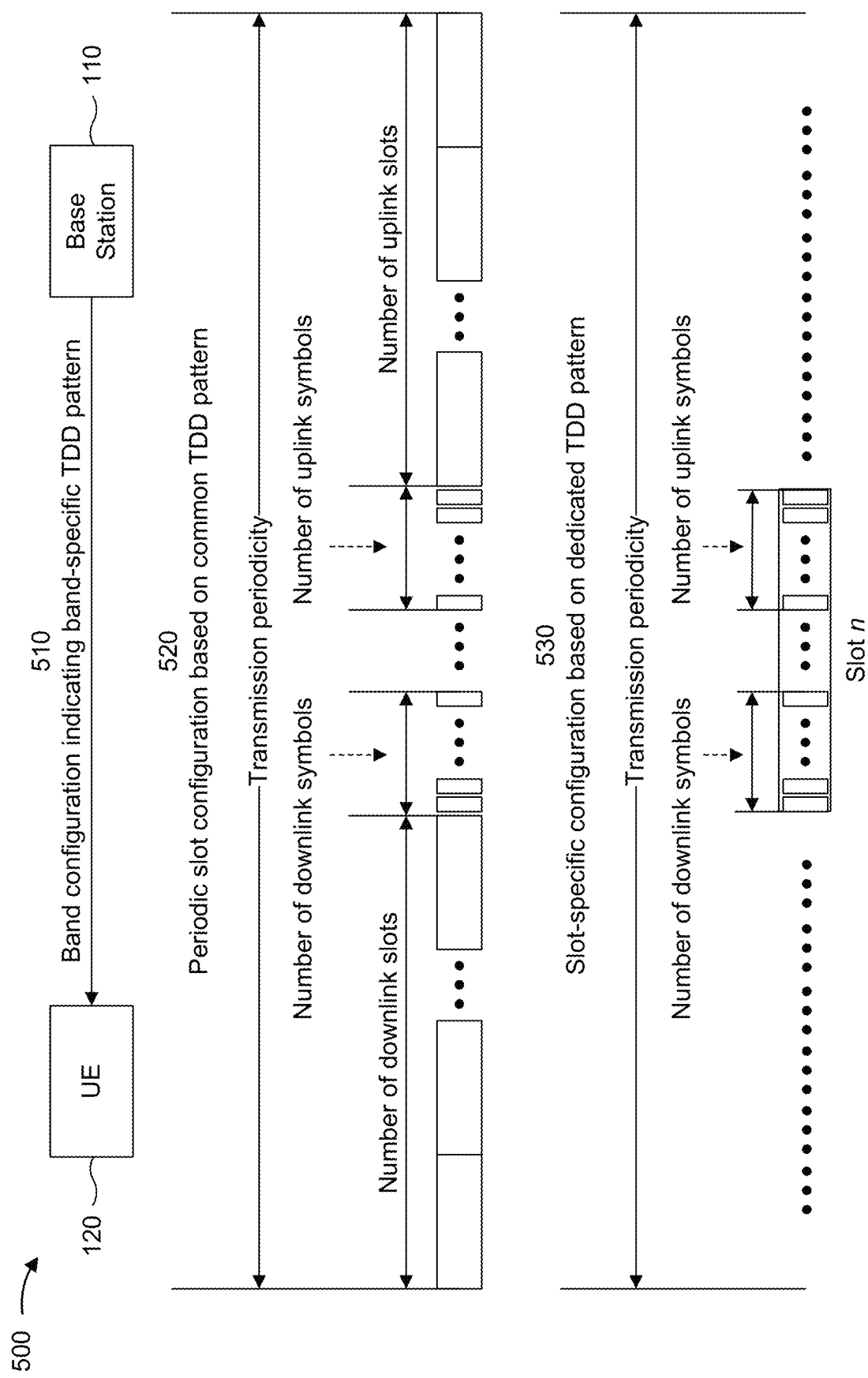
FIGS. 5A-5B are diagrams illustrating an example associated with timing considerations and switching between TDD patterns in a flexible BWP.
Figure 5B:
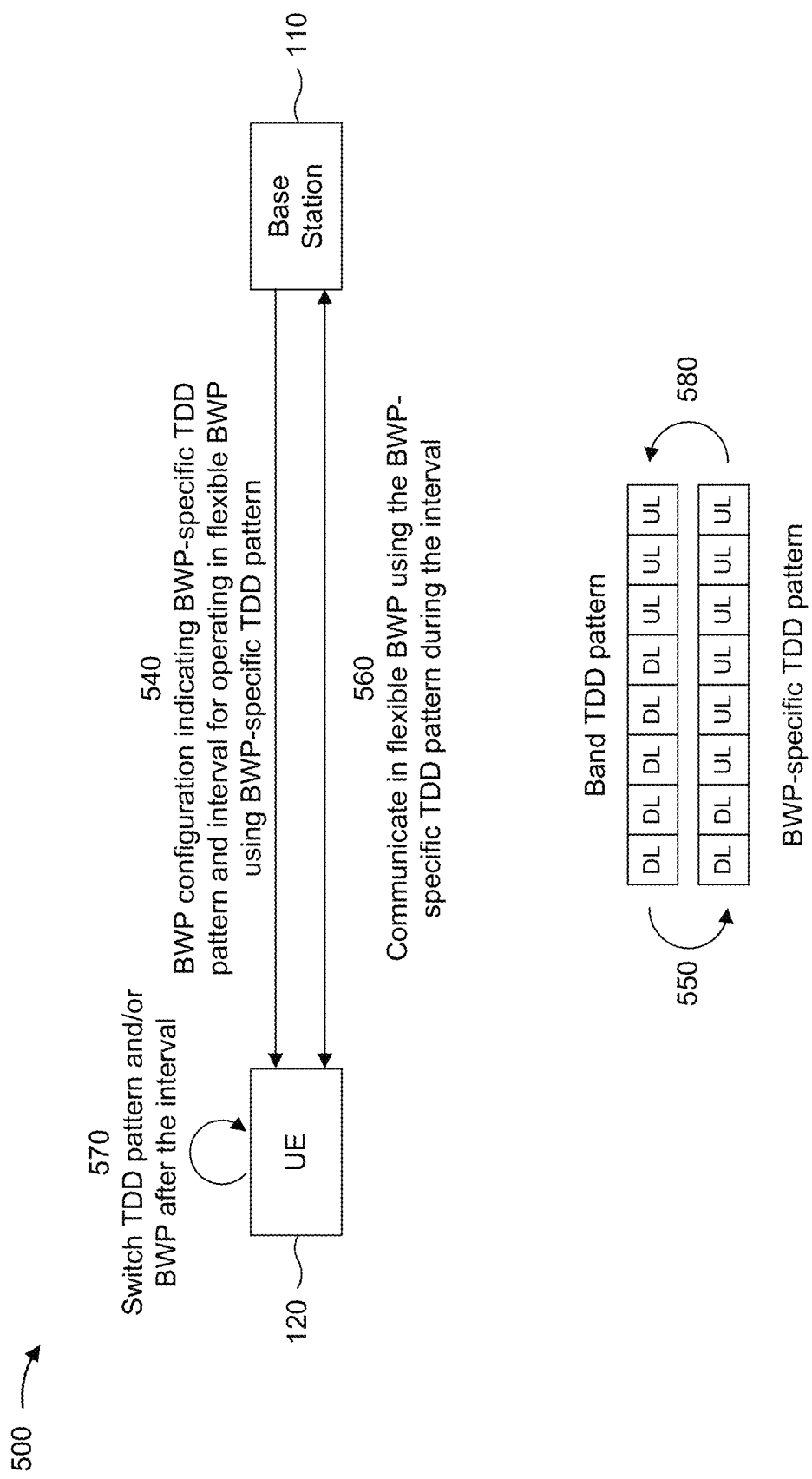

FIGS. 5A-5B are diagrams illustrating an example 500 associated with timing considerations and switching between TDD patterns in a flexible BWP. As shown in FIGS. 5A-5B, example 500 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 5A, at 510, the base station 110 may transmit, and the UE 120 may receive, a band configuration that indicates a band-specific TDD pattern (e.g., for a component carrier or a frequency band in unpaired spectrum). For example, as shown in FIG. 5A at 520, the band-specific TDD pattern may include a periodic slot configuration that is based at least in part on one or more common TDD patterns using cell-specific signaling, such as a system information block (SIB) (e.g., SIB1), or using dedicated radio resource control (RRC) signaling for the UE 120. For example, in some aspects, a TDD-UL-DL-ConfigurationCommon parameter may indicate one or more common TDD patterns for a frequency band, where each common TDD pattern includes a transmission periodicity (e.g., a periodicity of the common TDD pattern), a number of consecutive full downlink slots at the start of each common TDD pattern, a number of consecutive downlink symbols that follow the last full downlink slot, a number of consecutive full uplink slots at the end of each common TDD pattern, and a number of consecutive uplink symbols that precede the first full uplink slot. As used herein, the term "number" may refer to a quantity where appropriate, and such terms may be used interchangeably. In general, the slot configuration may further include one or more flexible symbols (usable for downlink or uplink communication) between the last downlink symbol and the first uplink symbol, and the slots that encompass the flexible symbols, the consecutive downlink symbols that follow the last full downlink slot, and the consecutive uplink symbols that precede the first full uplink slot may be defined as flexible slots.

Accordingly, as further shown in FIG. 5A at 530, the base station 110 may configure all or part of the flexible slots and/or symbols using a dedicated TDD pattern (e.g., using UE-specific or group-common signaling). For example, a dedicated TDD pattern may be defined using a TDD-UL-DL-ConfigDedicated parameter, which indicates a slot index (e.g., a slot within a particular common TDD pattern) and one or more parameters to allocate symbols in the slot associated with the slot index to downlink or uplink communication. For example, the dedicated TDD pattern may indicate that all symbols in the indicated slot are allocated to downlink communication, may indicate that all symbols in the indicated slot are allocated to uplink communication, or may indicate a number of consecutive symbols in the beginning of the slot that are allocated to downlink communication and/or a number of consecutive symbols at the end of the slot that are allocated to uplink communication.

In some cases, the base station 110 may indicate the slot configuration to be used in the frequency band via a common TDD pattern and/or may indicate a slot configuration to be used by one or more UEs served by the base station 110 via a dedicated TDD pattern that configures (or reconfigures) one or more flexible slots or symbols associated with the common TDD pattern. Additionally, or alternatively, the base station 110 may transmit an SFI to indicate a slot configuration that allocates symbols within a slot to be downlink symbols, uplink symbols, or flexible symbols. For example, the SFI may be transmitted in downlink control information (DCI) that has a specific format associated with indicating a slot format (e.g., DCI format 2_0), and the base station 110 may configure the UE 120 with a SlotFormatCombination parameter that causes the UE 120 to monitor the DCI associated with indicating the slot format. In such cases, the DCI may include an SFI, which may have a value within a particular range (e.g., from 0 to 255) to indicate an allocation of downlink, uplink, and flexible symbols within a particular slot (e.g., as defined in 3GPP Technical Specification 38.213, Table 11.1.1-1). Accordingly, the UE 120 may determine the band-specific TDD pattern allocating transmission time intervals to downlink and/or uplink communication based at least in part on a combination of the common TDD pattern, the dedicated TDD pattern, and the SFI.

As shown in FIG. 5B, at 540, the base station 110 may transmit, and the UE 120 may receive, a BWP configuration that indicates a BWP-specific TDD pattern for a flexible BWP and an interval for operating in the flexible BWP using the BWP-specific TDD pattern. For example, as described above and as shown at 550, the base station 110 may configure, within a frequency band, one or more flexible BWPs with BWP-specific TDD patterns that the UE 120 may follow when operating in the flexible BWP(s) regardless of a communication direction indicated in the TDD pattern associated with the underlying frequency band. In this way, the base station 110 may configure one or more flexible BWPs with respective BWP-specific TDD patterns to enable the UE 120 to perform one or more full-duplex operations (e.g., performing an uplink transmission in a downlink transmission time interval or performing downlink reception in an uplink transmission time interval). For example, as shown at 560, the UE 120 and the base station 110 may communicate in the flexible BWP during the interval using the BWP-specific TDD pattern, which may include one or more downlink transmission time intervals that coincide with one or more uplink transmission time intervals in the band-specific TDD pattern and/or one or more uplink transmission time intervals that coincide with one or more downlink transmission time intervals in the band-specific TDD pattern.

In some aspects, the BWP configuration may include one or more RRC messages that configure the UE 120 to operate in the flexible BWP using the BWP-specific TDD pattern for a certain time period (e.g., a number of milliseconds or a number of seconds) or for a certain number of transmission time intervals (e.g., a number or quantity of frames, subframes, slots, and/or symbols). In such cases, the BWP configuration may indicate a start of the interval in which the UE 120 is to operate in the flexible BWP using the BWP-specific TDD pattern (e.g., a starting time or a starting transmission time interval) and a length of the interval in which the UE 120 is to operate in the flexible BWP using the BWP-specific TDD pattern (e.g., the time period of the interval or the number of transmission time intervals included in the interval). Accordingly, during the interval indicated in the BWP configuration, the UE 120 and the base station 110 may communicate on an uplink and/or a downlink using the BWP-specific TDD pattern for the flexible BWP. Furthermore, as shown at 570, the UE 120 may switch the TDD pattern and/or the BWP used to communicate with the base station 110 after the interval has ended. For example, as shown at 580, the UE 120 may switch from using the BWP-specific TDD pattern to using the band-specific TDD pattern (e.g., based at least in part on the common TDD pattern, the dedicated TDD pattern, and the SFI configured for the UE 120 for the underlying frequency band) after the interval has ended. Furthermore, in some aspects, the UE 120 may switch from communicating using the flexible BWP to a different BWP. In cases where the UE 120 switches to another flexible BWP, the UE 120 may follow the same TDD pattern of the previously active flexible BWP. Alternatively, in cases where the UE 120 switches to a legacy BWP (e.g., a downlink-only BWP or an uplink-only BWP), the UE 120 may follow the legacy TDD pattern associated with the underlying frequency band. Alternatively, in some aspects, the UE 120 may continue to communicate using the flexible BWP after the interval has ended, in which case the UE 120 may switch to the band-specific TDD pattern. For example, in cases where the UE 120 does not switch the active BWP, the UE 120 may maintain the flexible BWP as a downlink-only BWP or an uplink-only BWP and follow the band-specific TDD pattern.

In some aspects, the BWP configuration may indicate the interval in which the UE 120 is to operate in the flexible BWP using the BWP-specific TDD pattern according to a number of repetitions of the TDD pattern. For example, the BWP configuration may indicate a start of the interval in which the UE 120 is to operate in the flexible BWP using the BWP-specific TDD pattern (e.g., a starting time or transmission time interval) and may indicate that the length of the interval corresponds to a number of repetitions of the TDD pattern. For example, in FIG. 5B, the BWP-specific TDD pattern includes eight (8) transmission time intervals, with a TDD sequence of two (2) downlink transmission time intervals followed by six (6) uplink transmission time intervals. Accordingly, the interval in which the UE 120 operates in the flexible BWP using the BWP-specific TDD pattern may include one or more repetitions of the TDD sequence defined by the BWP-specific TDD pattern. Accordingly, during the interval (e.g., during the specified repetitions of the BWP-specific TDD pattern), the UE 120 and the base station 110 may communicate on an uplink and/or a downlink using the BWP-specific TDD pattern for the flexible BWP. Furthermore, at 570, the UE 120 may switch the TDD pattern and/or the BWP used to communicate with the base station 110 after the interval has ended. For example, after the interval (e.g., after the specified number of repetitions of the BWP-specific TDD pattern), the UE 120 may deactivate the flexible BWP and switch to the last active downlink BWP (e.g., a most recently active downlink BWP) or the last active uplink BWP (e.g., a most recently active uplink BWP), one or more default BWPs, and/or one or more BWPs indicated in an RRC configuration. In cases where the UE 120 switches to another flexible BWP, the UE 120 may follow the same TDD pattern of the previously active flexible BWP. Alternatively, in cases where the UE 120 switches to a downlink-only or uplink-only BWP, the UE 120 may follow the legacy TDD pattern associated with the underlying frequency band.

In some aspects, when the UE 120 is configured to switch to the last active or most recently active downlink or uplink BWP, multiple downlink BWPs and/or multiple uplink BWPs may have been active prior to the flexible BWP. For example, the multiple downlink BWPs may include a first downlink BWP that may have been active at a first time, a second downlink BWP that may have been active at a second time, and a third downlink BWP that may have been active at a third time. In one example, the first time may be earlier than the second time, and the second time may be earlier than the third time. The flexible BWP may have been active at a fourth time, where the third time is before the fourth time. In such an example, the third downlink BWP is the most recently active downlink BWP among the multiple downlink BWPs. The third downlink BWP in this example may also be referred to as the last active or most recently active BWP before the flexible BWP. In another example, the multiple uplink BWPs that may have been active prior to the flexible BWP may include a first uplink BWP that may have been active at a first time, a second uplink BWP that may have been active at a second time, and a third uplink BWP that may have been active at a third time, where the first time may be earlier than the second time, the second time may be earlier than the third time, and the third time may be earlier than a fourth time when the flexible BWP was active. In such an example, the third uplink BWP is the most recently active uplink BWP among the multiple uplink BWPs. The third uplink BWP in this example may also be referred to as the last active or most recently active BWP before the flexible BWP.

Alternatively, in some aspects, the BWP configuration may indicate the interval in which the UE 120 is to operate in the flexible BWP using the BWP-specific TDD pattern according to a timer. In some aspects, the timer may have a value that is known to the UE 120 (e.g., based at least in part on an RRC configuration), and one or more conditions to start the timer may be defined in one or more wireless communication standards and/or RRC-configured, where the one or more conditions may be based at least in part on when the flexible BWP is activated to enable communication using the BWP-specific TDD pattern. For example, in some aspects, the UE 120 may initiate the timer when the UE 120 activates the flexible BWP or when the UE 120 activates the flexible BWP at a time indicated in the BWP configuration. For example, the BWP configuration may indicate when the UE 120 is to start using the BWP-specific TDD pattern, and the UE 120 may start the timer when the flexible BWP is activated. Accordingly, at 560, the UE 120 and the base station 110 may communicate on an uplink and/or a downlink using the BWP-specific TDD pattern for the flexible BWP while the timer is running. Furthermore, at 570, the UE 120 may switch the TDD pattern and/or the BWP used to communicate with the base station 110 after the timer has expired. For example, the UE 120 may switch from using the BWP-specific TDD pattern to using the band-specific TDD pattern (e.g., based at least in part on the common TDD pattern, the dedicated TDD pattern, and the SFI configured for the UE 120 for the underlying frequency band) after the timer has expired. Furthermore, in some aspects, the UE 120 may switch from communicating using the flexible BWP to another BWP after the timer has expired. In cases where the UE 120 switches to another flexible BWP, the UE 120 may follow the same TDD pattern of the previously active flexible BWP. Alternatively, in cases where the UE 120 switches to a legacy BWP (e.g., a downlink-only BWP or an uplink-only BWP), the UE 120 may follow the legacy TDD pattern associated with the underlying frequency band. Alternatively, in some aspects, the UE 120 may continue to communicate using the flexible BWP after the timer has expired, in which case the UE 120 may switch to the band-specific TDD pattern. For example, in cases where the UE 120 does not switch the active BWP, the UE 120 may maintain the flexible BWP as a downlink-only BWP or an uplink-only BWP and follow the band-specific TDD pattern.

As indicated above, FIGS. 5A-5B are provided as an example. Other examples may differ from what is described with regard to FIGS. 5A-5B.

FIG. 6 is a flowchart of an example method 600 of wireless communication. The method 600 may be performed by, for example, a first network node (e.g., UE 120).

At 610, the first network node may receive a BWP configuration from a second network node, wherein the BWP configuration indicates a TDD pattern specific to a flexible BWP and an interval in which to operate in the flexible BWP using the TDD pattern specific to the flexible BWP. For example, the first network node (e.g., using communication manager 140 and/or reception component 802, depicted in FIG. 9) may receive a BWP configuration from a second network node, wherein the BWP configuration indicates a TDD pattern specific to a flexible BWP and an interval in which to operate in the flexible BWP using the TDD pattern specific to the flexible BWP, as described above in connection with, for example, FIG. 5B at 540. In some aspects, the BWP configuration indicates the interval as a number of transmission time intervals or a time period. In some aspects, the BWP configuration indicates a start and a length for the interval. In some aspects, the BWP configuration indicates the interval as a number of repetitions of the TDD pattern. In some aspects, the first network node may initiate, based at least in part on when the flexible BWP is activated to enable communication using the TDD pattern specific to the flexible BWP, a timer using the interval.

At 620, the first network node may communicate in the flexible BWP using the TDD pattern specific to the flexible BWP during the interval. For example, the first network node (e.g., using communication manager 140, reception component 802, and/or transmission component 804, depicted in FIG. 8) may communicate in the flexible BWP using the TDD pattern specific to the flexible BWP during the interval, as described above in connection with, for example, FIG. 5B at 550 and 560.

In some aspects, method 600 includes switching, after the interval and/or after the timer has expired, from the TDD pattern specific to the flexible BWP to a TDD pattern configuration for a frequency band that includes the flexible BWP.

In some aspects, method 600 includes switching, after interval, from the flexible BWP to one or more BWPs within the frequency band that includes the flexible BWP and communicating in the one or more BWPs using the TDD pattern configured for the frequency band that includes the flexible BWP. In some aspects, the one or more BWPs include a downlink BWP and an uplink BWP that were most recently active prior to the flexible BWP. In some aspects, the one or more BWPs include a default downlink BWP and a default uplink BWP. In some aspects, the one or more BWPs include one or more of a downlink BWP or an uplink BWP indicated in the BWP configuration.

In some aspects, method 600 includes communicating, after the interval, in the flexible BWP using a downlink-only or an uplink-only configuration based at least in part on the TDD pattern configured for the frequency band that includes the flexible BWP.

In some aspects, method 600 includes switching, after the interval, from the flexible BWP to a BWP within the frequency band that includes the flexible BWP and communicating in the BWP using the TDD pattern specific to the flexible BWP based at least in part on the BWP having a flexible configuration.

Although FIG. 6 shows example blocks of method 600, in some aspects, method 600 may include additional blocks, fewer blocks, different blocks, or differently arranged blocks than those depicted in FIG. 6. Additionally, or alternatively, two or more of the blocks of method 600 may be performed in parallel.

FIG. 7 is a flowchart of an example method 700 of wireless communication. The method 700 may be performed by, for example, a first network node (e.g., base station 110).

At 710, the first network node may transmit a BWP configuration to a second network node, wherein the BWP configuration indicates a TDD pattern specific to a flexible BWP and an interval in which to operate in the flexible BWP using the TDD pattern specific to the flexible BWP. For example, the first network node (e.g., using communication manager 150 and/or transmission component 1004, depicted in FIG. 10) may transmit a BWP configuration to a second network node, wherein the BWP configuration indicates a TDD pattern specific to a flexible BWP and an interval in which to operate in the flexible BWP using the TDD pattern specific to the flexible BWP, as described above in connection with, for example, FIG. 5B at 540. In some aspects, the BWP configuration indicates the interval as a number of transmission time intervals or a time period. In some aspects, the BWP configuration indicates a start and a length for the interval. In some aspects, the BWP configuration indicates the interval as a number of repetitions of the TDD pattern. In some aspects, the BWP configuration indicates the interval according to a timer that is initiated based at least in part on when the flexible BWP is activated to enable communication using the TDD pattern specific to the flexible BWP.

At 720, the first network node may communicate with the second network node in the flexible BWP using the TDD pattern specific to the flexible BWP during the interval. For example, the first network node (e.g., using communication manager 150, reception component 1002, and/or transmission component 1004, depicted in FIG. 10) may communicate with the second network node in the flexible BWP using the TDD pattern specific to the flexible BWP during the interval, as described above in connection with, for example, FIG. 5B at 550 and 560.

Although FIG. 7 shows example blocks of method 700, in some aspects, method 700 may include additional blocks, fewer blocks, different blocks, or differently arranged blocks than those depicted in FIG. 7. Additionally, or alternatively, two or more of the blocks of method 700 may be performed in parallel.

Figure 8:
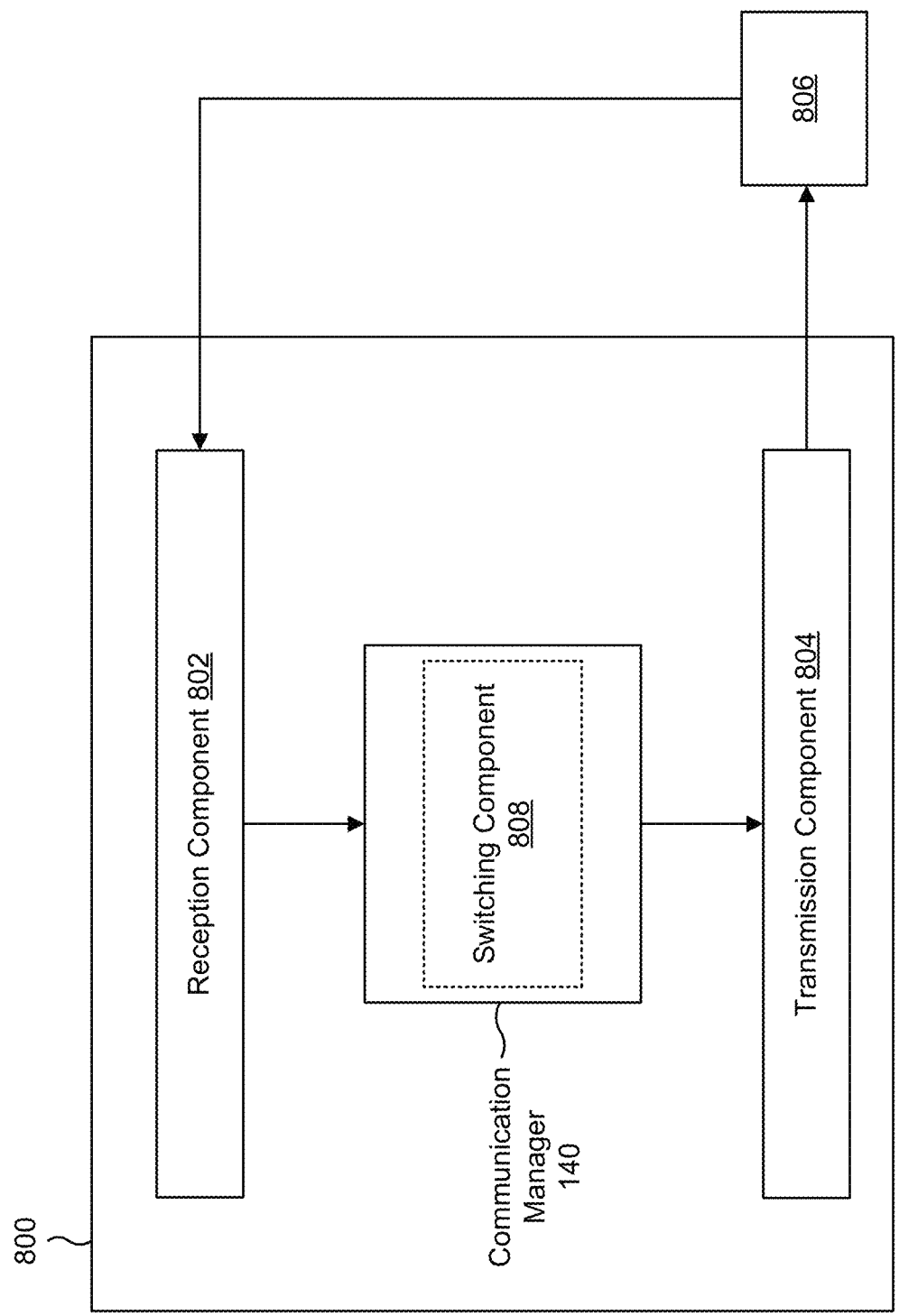
FIG. 8 is a diagram of an example apparatus for wireless communication.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a switching component 808, among other examples.

In some aspects, the apparatus 800 may be configured to perform one or more operations described herein in connection with FIGS. 5A-5B. Additionally, or alternatively, the apparatus 800 may be configured to perform one or more methods described herein, such as method 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a BWP configuration from a network node, wherein the BWP configuration indicates a TDD pattern specific to a flexible BWP and an interval in which to operate in the flexible BWP using the TDD pattern specific to the flexible BWP. The reception component 802 and/or the transmission component 804 may communicate in the flexible BWP using the TDD pattern specific to the flexible BWP during the interval.

The switching component 808 may switch, after the interval and/or after a timer has expired, from the TDD pattern specific to the flexible BWP to a TDD pattern configuration for a frequency band that includes the flexible BWP.

The switching component 808 may switch, after the interval, from the flexible BWP to one or more BWPs within the frequency band that includes the flexible BWP. The reception component 802 and/or the transmission component 804 may communicate in the one or more new BWPs using the TDD pattern configured for the frequency band that includes the flexible BWP.

The reception component 802 and/or the transmission component 804 may communicate, after the interval, in the flexible BWP using a downlink-only or an uplink-only configuration based at least in part on the TDD pattern configured for the frequency band that includes the flexible BWP.

The switching component 808 may switch, after the interval, from the flexible BWP to a BWP within the frequency band that includes the flexible BWP. The reception component 802 and/or the transmission component 804 may communicate in the BWP using the TDD pattern specific to the flexible BWP based at least in part on the BWP having a flexible configuration.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
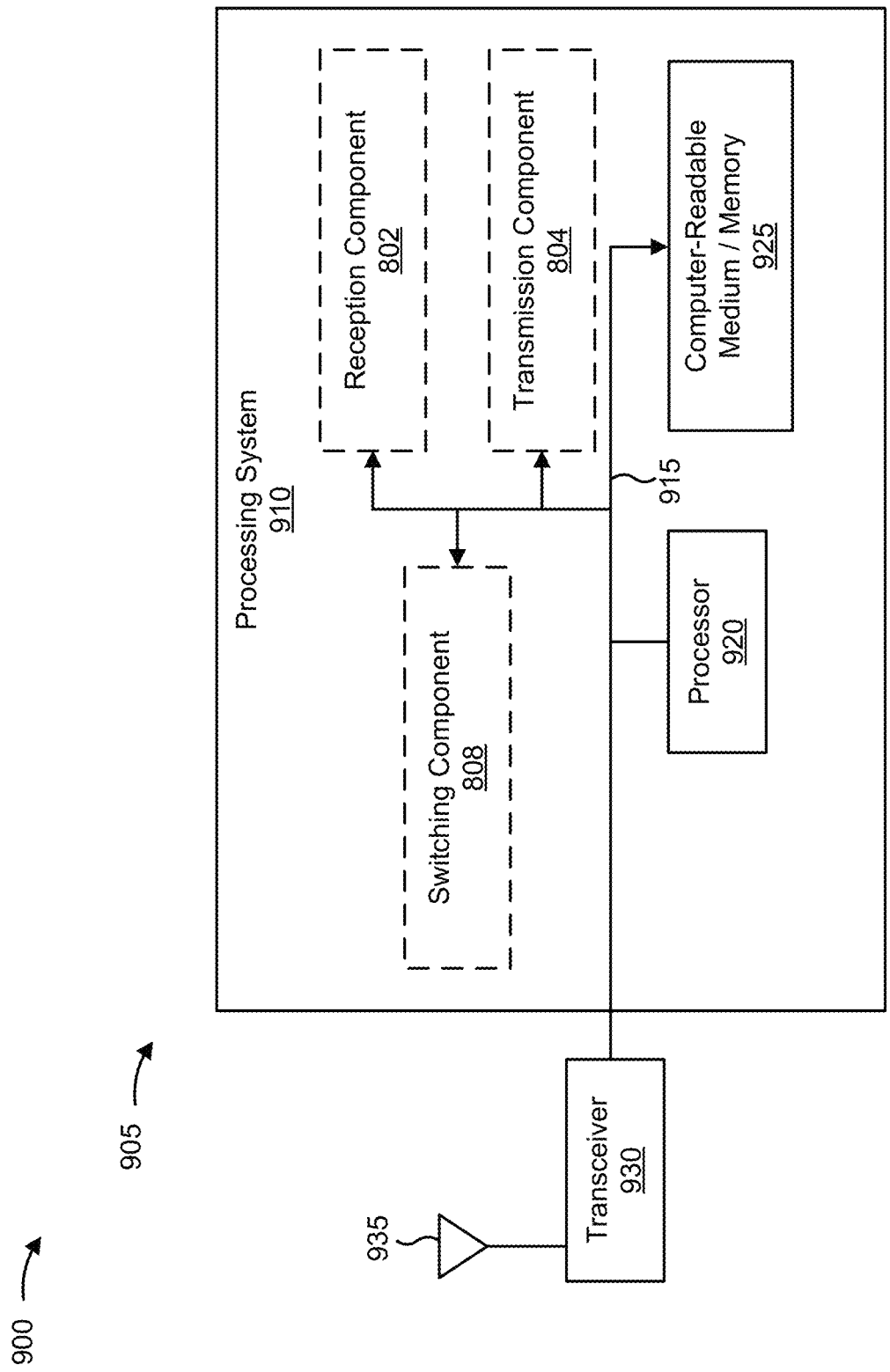
FIG. 9 is a diagram illustrating an example of a hardware implementation for an apparatus employing a processing system.

FIG. 9 is a diagram illustrating an example 900 of a hardware implementation for an apparatus 905 employing a processing system 910. The apparatus 905 may be a UE.

The processing system 910 may be implemented with a bus architecture, represented generally by the bus 915. The bus 915 may include any number of interconnecting buses and bridges depending on the specific application of the processing system 910 and the overall design constraints. The bus 915 links together various circuits including one or more processors and/or hardware components, represented by the processor 920, the illustrated components, and the computer-readable medium/memory 925. The bus 915 may also link various other circuits, such as timing sources, peripherals, voltage regulators, and/or power management circuits.

The processing system 910 may be coupled to a transceiver 930. The transceiver 930 is coupled to one or more antennas 935. The transceiver 930 provides a means for communicating with various other apparatuses over a transmission medium. The transceiver 930 receives a signal from the one or more antennas 935, extracts information from the received signal, and provides the extracted information to the processing system 910, specifically the reception component 802. In addition, the transceiver 930 receives information from the processing system 910, specifically the transmission component 804, and generates a signal to be applied to the one or more antennas 935 based at least in part on the received information.

The processing system 910 includes a processor 920 coupled to a computer-readable medium/memory 925. The processor 920 is responsible for general processing, including the execution of software stored on the computer-readable medium/memory 925. The software, when executed by the processor 920, causes the processing system 910 to perform the various functions described herein for any particular apparatus. The computer-readable medium/memory 925 may also be used for storing data that is manipulated by the processor 920 when executing software. The processing system further includes at least one of the illustrated components. The components may be software modules running in the processor 920, resident/stored in the computer-readable medium/memory 925, one or more hardware modules coupled to the processor 920, or some combination thereof.

In some aspects, the processing system 910 may be a component of the UE 120 and may include the memory 282 and/or at least one of the TX MIMO processor 266, the receive (RX) processor 258, and/or the controller/processor 280. In some aspects, the apparatus 905 for wireless communication includes means for receiving a BWP configuration from a network node, wherein the BWP configuration indicates a TDD pattern specific to a flexible BWP and an interval in which to operate in the flexible BWP using the TDD pattern specific to the flexible BWP and means for communicating in the flexible BWP during the interval using the TDD pattern specific to the flexible BWP. The aforementioned means may be one or more of the aforementioned components of the apparatus 800 and/or the processing system 910 of the apparatus 905 configured to perform the functions recited by the aforementioned means. As described elsewhere herein, the processing system 910 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 9 is provided as an example. Other examples may differ from what is described in connection with FIG. 9.

Figure 10:
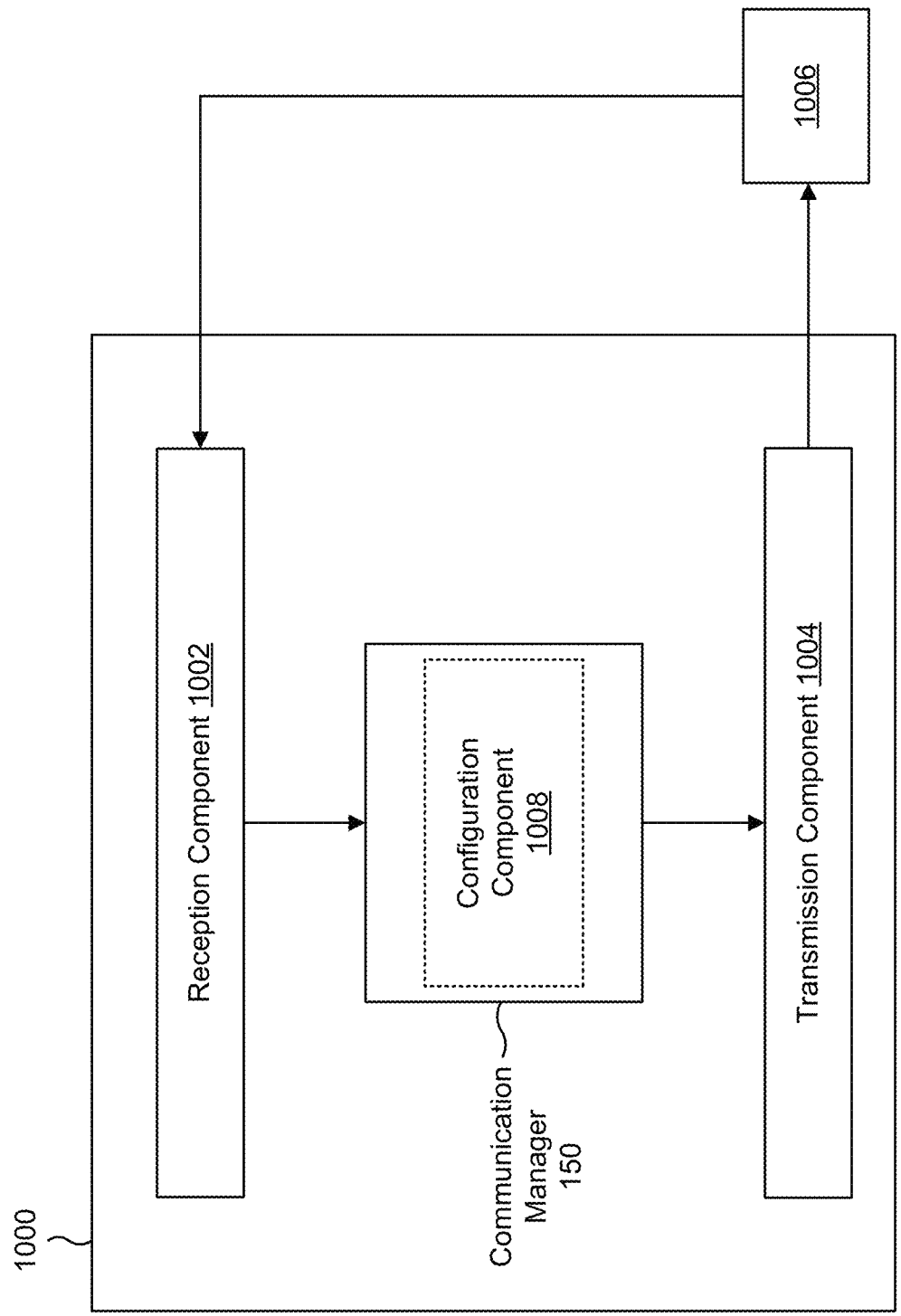
FIG. 10 is a diagram of an example apparatus for wireless communication.

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a configuration component 1008, among other examples.

In some aspects, the apparatus 1000 may be configured to perform one or more operations described herein in connection with FIGS. 5A-5B. Additionally, or alternatively, the apparatus 1000 may be configured to perform one or more methods described herein, such method 700 of FIG. 7. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The configuration component 1008 may determine a BWP configuration for a network node, wherein the BWP configuration includes a TDD pattern specific to a flexible BWP and an interval in which to operate in the flexible BWP using the TDD pattern specific to the flexible BWP. The transmission component 1004 may transmit the BWP configuration to the network node. The reception component 1002 and/or the transmission component 1004 may communicate with the UE in the flexible BWP using the TDD pattern specific to the flexible BWP during the interval.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
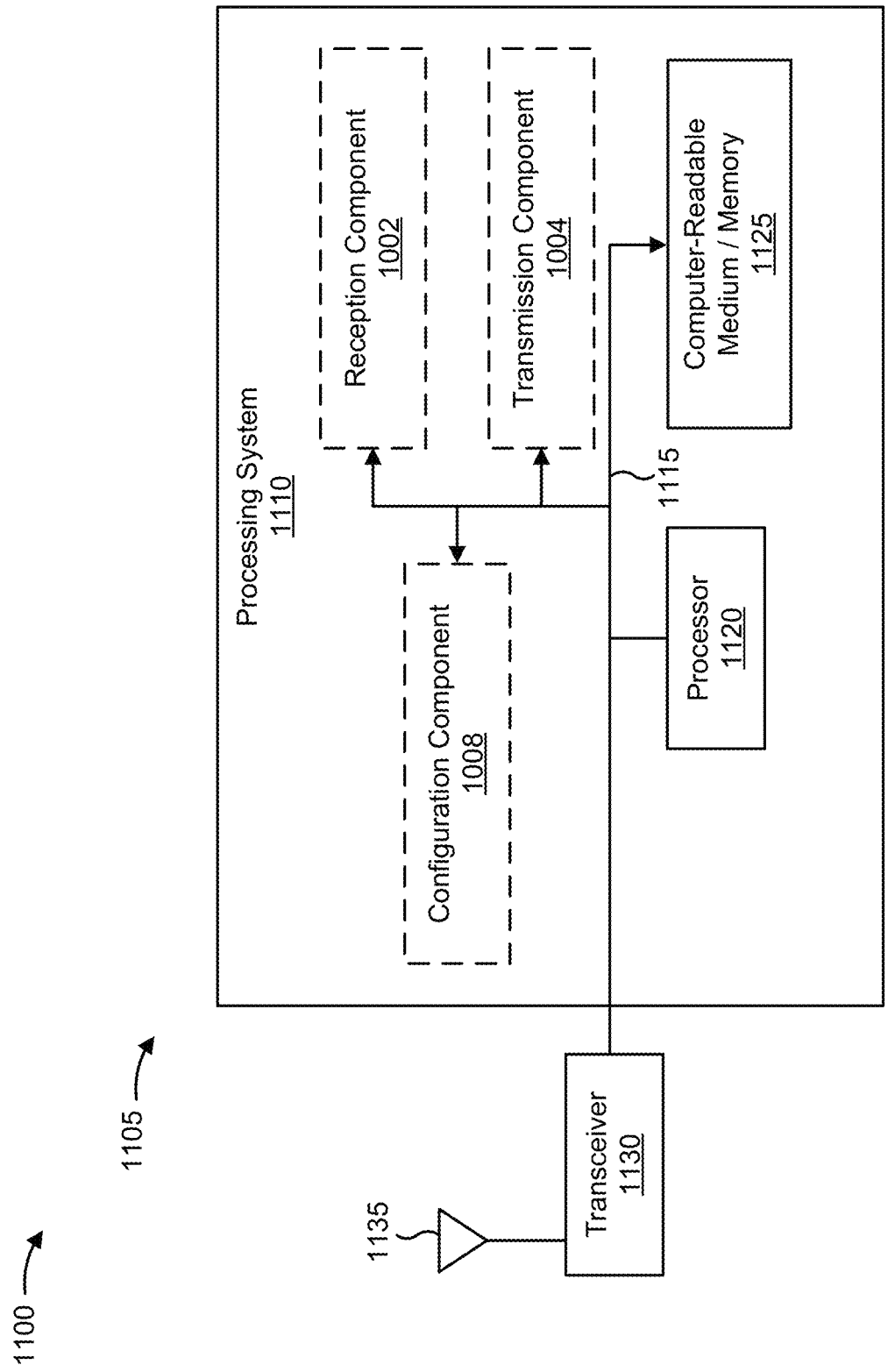
FIG. 11 is a diagram illustrating an example of a hardware implementation for an apparatus employing a processing system.

FIG. 11 is a diagram illustrating an example 1100 of a hardware implementation for an apparatus 1105 employing a processing system 1110. The apparatus 1105 may be a base station.

The processing system 1110 may be implemented with a bus architecture, represented generally by the bus 1115. The bus 1115 may include any number of interconnecting buses and bridges depending on the specific application of the processing system 1110 and the overall design constraints. The bus 1115 links together various circuits including one or more processors and/or hardware components, represented by the processor 1120, the illustrated components, and the computer-readable medium/memory 1125. The bus 1115 may also link various other circuits, such as timing sources, peripherals, voltage regulators, and/or power management circuits.

The processing system 1110 may be coupled to a transceiver 1130. The transceiver 1130 is coupled to one or more antennas 1135. The transceiver 1130 provides a means for communicating with various other apparatuses over a transmission medium. The transceiver 1130 receives a signal from the one or more antennas 1135, extracts information from the received signal, and provides the extracted information to the processing system 1110, specifically the reception component 1002. In addition, the transceiver 1130 receives information from the processing system 1110, specifically the transmission component 1004, and generates a signal to be applied to the one or more antennas 1135 based at least in part on the received information.

The processing system 1110 includes a processor 1120 coupled to a computer-readable medium/memory 1125. The processor 1120 is responsible for general processing, including the execution of software stored on the computer-readable medium/memory 1125. The software, when executed by the processor 1120, causes the processing system 1110 to perform the various functions described herein for any particular apparatus. The computer-readable medium/memory 1125 may also be used for storing data that is manipulated by the processor 1120 when executing software. The processing system further includes at least one of the illustrated components. The components may be software modules running in the processor 1120, resident/stored in the computer-readable medium/memory 1125, one or more hardware modules coupled to the processor 1120, or some combination thereof.

In some aspects, the processing system 1110 may be a component of the base station 110 and may include the memory 242 and/or at least one of the TX MIMO processor 230, the RX processor 238, and/or the controller/processor 240. In some aspects, the apparatus 1105 for wireless communication includes means for transmitting a BWP configuration to a network node, wherein the BWP configuration indicates a TDD pattern specific to a flexible BWP and an interval in which to operate in the flexible BWP using the TDD pattern specific to the flexible BWP and means for communicating with the network node in the flexible BWP during the interval using the TDD pattern specific to the flexible BWP. The aforementioned means may be one or more of the aforementioned components of the apparatus 1000 and/or the processing system 1110 of the apparatus 1105 configured to perform the functions recited by the aforementioned means. As described elsewhere herein, the processing system 1110 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 11 is provided as an example. Other examples may differ from what is described in connection with FIG. 11.

The following provides an overview of some Aspects of the present disclosure:

Aspect 1: A method of wireless communication performed by a first network node, comprising: receiving a BWP configuration from a second network node, wherein the BWP configuration indicates a TDD pattern specific to a flexible BWP and an interval in which to operate in the flexible BWP using the TDD pattern specific to the flexible BWP; and communicating in the flexible BWP using the TDD pattern specific to the flexible BWP during the interval.

Aspect 2: The method of Aspect 1, wherein the BWP configuration indicates the interval as a number of transmission time intervals or a time period.

Aspect 3: The method of any of Aspects 1-2, wherein the BWP configuration indicates a start and a length for the interval.

Aspect 4: The method of Aspect 1, wherein the BWP configuration indicates the interval as a number of repetitions of the TDD pattern.

Aspect 5: The method of Aspect 1, further comprising: initiating, based at least in part on when the flexible BWP is activated to enable communication using the TDD pattern specific to the flexible BWP, a timer using the interval.

Aspect 6: The method of Aspect 5, further comprising: switching, after the timer has expired, from the TDD pattern specific to the flexible BWP to a TDD pattern configuration for a frequency band that includes the flexible BWP.

Aspect 7: The method of any of Aspects 1-6, further comprising: switching, after the interval, from the TDD pattern specific to the flexible BWP to a TDD pattern configuration for a frequency band that includes the flexible BWP.

Aspect 8: The method of Aspect 7, further comprising: switching, after the interval, from the flexible BWP to one or more BWPs within the frequency band that includes the flexible BWP; and communicating in the one or more BWPs using the TDD pattern configured for the frequency band that includes the flexible BWP.

Aspect 9: The method of Aspect 8, wherein the one or more BWPs include a downlink BWP and an uplink BWP that were most recently active prior to the flexible BWP.

Aspect 10: The method of any of Aspects 8-9, wherein the one or more BWPs include a default downlink BWP and a default uplink BWP.

Aspect 11: The method of any of Aspects 8-10, wherein the one or more BWPs include one or more of a downlink BWP or an uplink BWP indicated in the BWP configuration.

Aspect 12: The method of Aspect 7, further comprising: communicating, after the interval, in the flexible BWP using a downlink-only or an uplink-only configuration based at least in part on the TDD pattern configured for the frequency band that includes the flexible BWP.

Aspect 13: The method of Aspect 7, further comprising: switching, after the interval, from the flexible BWP to a BWP within the frequency band that includes the flexible BWP; and communicating in the BWP using the TDD pattern specific to the flexible BWP based at least in part on the BWP having a flexible configuration.

Aspect 14: A method of wireless communication performed by a first network node, comprising: transmitting a BWP configuration to a second network node, wherein the BWP configuration indicates a TDD pattern specific to a flexible BWP and an interval in which to operate in the flexible BWP using the TDD pattern specific to the flexible BWP; and communicating with the second network node in the flexible BWP using the TDD pattern specific to the flexible BWP during the interval.

Aspect 15: The method of Aspect 14, wherein the BWP configuration indicates the interval as a number of transmission time intervals or a time period.

Aspect 16: The method of any of Aspects 14-15, wherein the BWP configuration indicates a start and a length for the interval.

Aspect 17: The method of Aspect 14, wherein the BWP configuration indicates the interval as a number of repetitions of the TDD pattern.

Aspect 18: The method of Aspect 14, wherein the BWP configuration indicates the interval according to a timer that is initiated based at least in part on when the flexible BWP is activated to enable communication using the TDD pattern specific to the flexible BWP.

Aspect 19: An apparatus for wireless communication at a device, comprising a processor; memory coupled with the processor; and instructions stored in the memory and executable by the processor to cause the apparatus to perform the method of one or more of Aspects 1-13.

Aspect 20: A device for wireless communication, comprising a memory and one or more processors coupled to the memory, the one or more processors configured to perform the method of one or more of Aspects 1-13.

Aspect 21: An apparatus for wireless communication, comprising at least one means for performing the method of one or more of Aspects 1-13.

Aspect 22: A non-transitory computer-readable medium storing code for wireless communication, the code comprising instructions executable by a processor to perform the method of one or more of Aspects 1-13.

Aspect 23: A non-transitory computer-readable medium storing a set of instructions for wireless communication, the set of instructions comprising one or more instructions that, when executed by one or more processors of a device, cause the device to perform the method of one or more of Aspects 1-13.

Aspect 24: An apparatus for wireless communication at a device, comprising a processor; memory coupled with the processor; and instructions stored in the memory and executable by the processor to cause the apparatus to perform the method of one or more of Aspects 14-18.

Aspect 25: A device for wireless communication, comprising a memory and one or more processors coupled to the memory, the one or more processors configured to perform the method of one or more of Aspects 14-18.

Aspect 26: An apparatus for wireless communication, comprising at least one means for performing the method of one or more of Aspects 14-18.

Aspect 27: A non-transitory computer-readable medium storing code for wireless communication, the code comprising instructions executable by a processor to perform the method of one or more of Aspects 14-18.

Aspect 28: A non-transitory computer-readable medium storing a set of instructions for wireless communication, the set of instructions comprising one or more instructions that, when executed by one or more processors of a device, cause the device to perform the method of one or more of Aspects 14-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. Systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

Even though particular combinations of features are recited in the claims and/or disclosed in the specification, these combinations do not limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" covers the following alternatives: a, b, c, a+b, a+c, b+c, and a+b+c, as well as any combination with multiples of the same element, such as a+a, a+a+a, a+a+b, a+a+c, a+b+b, a+c+c, b+b, b+b+b, b+b+c, c+c, and/or c+c+c).

No element, act, or instruction used herein should be construed as critical or essential unless explicitly described as such. Also, as used herein, the articles "a" and "an" include one or more items and may be used interchangeably with "one or more." Further, as used herein, the article "the" includes one or more items referenced in connection with the article "the" and may be used interchangeably with "the one or more." Furthermore, as used herein, the terms "set" and "group" include one or more items and may be used interchangeably with "one or more." Where only one item is intended, the phrase "only one" or similar language is used. Also, as used herein, the terms "has," "have," "having," or the like are open-ended terms that do not limit an element that they modify (e.g., an element "having" A may also have B). Further, the phrase "based on" means "based at least in part on" unless explicitly stated otherwise. Also, as used herein, the term "or" is inclusive when used in a series and may be used interchangeably with "and/or," unless explicitly stated otherwise (e.g., if used in combination with "either" or "only one of").

What is claimed is:

1. A network node for wireless communication, comprising:
   a memory; and
   one or more processors coupled to the memory, wherein the network node is configured to:
      receive a bandwidth part (BWP) configuration, wherein the BWP configuration indicates a time division duplexing (TDD) pattern specific to a flexible BWP and an interval in which to operate in the flexible BWP using the TDD pattern specific to the flexible BWP;
      initiate, based at least in part on activation of the flexible BWP to enable communication using the TDD pattern specific to the flexible BWP, a timer configured to use the interval;
      communicate, during the interval, in the flexible BWP using the TDD pattern specific to the flexible BWP; and
      switch, after the timer has expired, from the TDD pattern specific to the flexible BWP to a TDD pattern configuration for a frequency band that includes the flexible BWP.

2. The network node of claim 1, wherein the BWP configuration indicates the interval as a number of transmission time intervals or a time period.

3. The network node of claim 1, wherein the BWP configuration indicates a start and a length for the interval.

4. The network node of claim 1, wherein the BWP configuration indicates the interval as a number of repetitions of the TDD pattern.

5. A network node for wireless communication, comprising:
   a memory; and
   one or more processors coupled to the memory, wherein the network node is configured to:
      receive a bandwidth part (BWP) configuration, wherein the BWP configuration indicates a time division duplexing (TDD) pattern specific to a flexible BWP and a time interval in which to operate in the flexible BWP using the TDD pattern specific to the flexible BWP;
      communicate, during the time interval indicated by the BWP configuration, in the flexible BWP using the TDD pattern specific to the flexible BWP;
      switch, after the time interval indicated by the BWP configuration, from the TDD pattern specific to the flexible BWP to a TDD pattern configuration for a frequency band that includes the flexible BWP;
      switch, after the time interval, from the flexible BWP to one or more BWPs within the frequency band that includes the flexible BWP, and
      communicate in the one or more BWPs using the TDD pattern configuration for the frequency band that includes the flexible BWP.

6. The network node of claim 5, wherein the one or more BWPs include a downlink BWP and an uplink BWP that were most recently active prior to the flexible BWP.

7. The network node of claim 5, wherein the one or more BWPs include a default downlink BWP and a default uplink BWP.

8. The network node of claim 5, wherein the one or more BWPs include one or more of a downlink BWP or an uplink BWP indicated in the BWP configuration.

9. The network node of claim 5, wherein the network node is configured to:
   communicate, after the time interval, in the flexible BWP using a downlink-only or an uplink-only configuration based at least in part on the TDD pattern configuration for the frequency band that includes the flexible BWP.

10. A first network node for wireless communication, comprising:
    a memory; and
    one or more processors coupled to the memory, wherein the first network node is configured to:
       transmit a bandwidth part (BWP) configuration to a second network node, wherein the BWP configuration indicates a time division duplexing (TDD) pattern specific to a flexible BWP and an interval in which to operate in the flexible BWP using the TDD pattern specific to the flexible BWP, wherein the interval is indicated as a timer duration associated with activation of the flexible BWP;
       communicate, during the interval, with the second network node in the flexible BWP using the TDD pattern specific to the flexible BWP; and
       switch, after the interval, from the TDD pattern specific to the flexible BWP to a TDD pattern configuration for a frequency band that includes the flexible BWP.

11. The first network node of claim 10, wherein the BWP configuration indicates the interval as a number of transmission time intervals or a time period.

12. The first network node of claim 10, wherein the BWP configuration indicates a start and a length for the interval.

13. The first network node of claim 10, wherein the BWP configuration indicates the interval as a number of repetitions of the TDD pattern.

14. A method of wireless communication performed by a network node, comprising:
    receiving a bandwidth part (BWP) configuration, wherein the BWP configuration indicates a time division duplexing (TDD) pattern specific to a flexible BWP and an interval in which to operate in the flexible BWP using the TDD pattern specific to the flexible BWP;
    initiating, based at least in part on activation of the flexible BWP to enable communication using the TDD pattern specific to the flexible BWP, a timer configured to use the interval;
    communicating, during the interval, in the flexible BWP using the TDD pattern specific to the flexible BWP; and
    switching, after the timer has expired, from the TDD pattern specific to the flexible BWP to a TDD pattern configuration for a frequency band that includes the flexible BWP.

15. The method of claim 14, wherein the BWP configuration indicates the interval as a number of transmission time intervals or a time period.

16. The method of claim 14, wherein the BWP configuration indicates a start and a length for the interval.

17. The method of claim 14, wherein the BWP configuration indicates the interval as a number of repetitions of the TDD pattern.

18. A method of wireless communication performed by a network node, comprising:
    receiving a bandwidth part (BWP) configuration, wherein the BWP configuration indicates a time division duplexing (TDD) pattern specific to a flexible BWP and a time interval in which to operate in the flexible BWP using the TDD pattern specific to the flexible BWP;

communicating, during the time interval indicated by the BWP configuration, in the flexible BWP using the TDD pattern specific to the flexible BWP;

switching, after the time interval indicated by the BWP configuration, from the TDD pattern specific to the flexible BWP to a TDD pattern configuration for a frequency band that includes the flexible BWP;

switching, after the time interval, from the flexible BWP to one or more BWPs within the frequency band that includes the flexible BWP; and communicating in the one or more BWPs using the TDD pattern configuration for the frequency band that includes the flexible BWP.

19. The method of claim 18, wherein the one or more BWPs include a downlink BWP and an uplink BWP that were most recently active prior to the flexible BWP, a default downlink BWP and a default uplink BWP, or one or more of a downlink BWP or an uplink BWP indicated in the BWP configuration.

20. The method of claim 18, further comprising:

communicating, after the time interval, in the flexible BWP using a downlink-only or an uplink-only configuration based at least in part on the TDD pattern configuration for the frequency band that includes the flexible BWP.

21. The network node of claim 1, wherein the network node is configured to:

switch, after the interval, from the flexible BWP to one or more BWPs within the frequency band that includes the flexible BWP; and communicate in the one or more BWPs using the TDD pattern configuration for the frequency band that includes the flexible BWP.

22. The network node of claim 21, wherein the one or more BWPs include a downlink BWP and an uplink BWP that were most recently active prior to the flexible BWP.

23. The network node of claim 21, wherein the one or more BWPs include a default downlink BWP and a default uplink BWP.

24. The network node of claim 21, wherein the one or more BWPs include one or more of a downlink BWP or an uplink BWP indicated in the BWP configuration.

25. The network node of claim 1, wherein the network node is configured to:

communicate, after the interval, in the flexible BWP using a downlink-only or an uplink-only configuration based at least in part on the TDD pattern configuration for the frequency band that includes the flexible BWP.

26. The network node of claim 1, wherein the network node is configured to:

switch, after the interval, from the flexible BWP to a BWP within the frequency band that includes the flexible BWP; and communicate in the BWP using the TDD pattern specific to the flexible BWP based at least in part on the BWP having a flexible configuration.

27. The first network node of claim 10, wherein the first network node is configured to:

switch, after the interval, from the flexible BWP to one or more BWPs within the frequency band that includes the flexible BWP; and communicate in the one or more BWPs using the TDD pattern configuration for the frequency band that includes the flexible BWP.

28. The first network node of claim 27, wherein the one or more BWPs include a downlink BWP and an uplink BWP that were most recently active prior to the flexible BWP.

29. The first network node of claim 27, wherein the one or more BWPs include a default downlink BWP and a default uplink BWP.

30. The first network node of claim 27, wherein the one or more BWPs include one or more of a downlink BWP or an uplink BWP indicated in the BWP configuration.

31. The first network node of claim 10, wherein the first network node is configured to:

communicate, after the interval, in the flexible BWP using a downlink-only or an uplink-only configuration based at least in part on the TDD pattern configuration for the frequency band that includes the flexible BWP.

32. The first network node of claim 10, wherein the first network node is configured to:

switch, after the interval, from the flexible BWP to a BWP within the frequency band that includes the flexible BWP; and communicate in the BWP using the TDD pattern specific to the flexible BWP based at least in part on the BWP having a flexible configuration.

* * * * *